United States Patent
Elisha et al.

(10) Patent No.: US 12,524,707 B2
(45) Date of Patent: *Jan. 13, 2026

(54) SYSTEM AND METHOD FOR IMPROVING MACHINE LEARNING MODELS BY DETECTING AND REMOVING INACCURATE TRAINING DATA

(71) Applicant: Microsoft Technology Licensing, LLC, Redmond, WA (US)

(72) Inventors: Oren Elisha, Hertzeliya (IL); Ami Luttwak, Binyamina (IL); Hila Yehuda, Tel Aviv (IL); Adar Kahana, Natanya (IL); Maya Bechler-Speicher, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/426,735

(22) Filed: Jan. 30, 2024

(65) Prior Publication Data

US 2024/0202591 A1 Jun. 20, 2024

Related U.S. Application Data

(63) Continuation of application No. 18/185,679, filed on Mar. 17, 2023, now Pat. No. 11,928,567, which is a (Continued)

(51) Int. Cl.
*H04L 9/40* (2022.01)
*G06N 5/04* (2023.01)
*G06N 20/00* (2019.01)

(52) U.S. Cl.
CPC .............. *G06N 20/00* (2019.01); *G06N 5/04* (2013.01)

(58) Field of Classification Search
CPC ................................ G06N 20/00; G06N 5/04
See application file for complete search history.

(56) References Cited

U.S. PATENT DOCUMENTS 9,818,066 B1 * 11/2017 Rammohan .............. G06F 16/93
11,556,746 B1 * 1/2023 Dasgupta ............... G06N 20/00
(Continued)

OTHER PUBLICATIONS

Notice of Allowance mailed on Nov. 6, 2024, in U.S. Appl. No. 18/050,364, 14 pages.
(Continued)

*Primary Examiner* — Thaddeus J Plecha
(74) *Attorney, Agent, or Firm* — Weaver IP L.L.C.

(57) ABSTRACT

Methods, systems and computer program products are described to improve machine learning (ML) model-based classification of data items by identifying and removing inaccurate training data. Inaccurate training samples may be identified, for example, based on excessive variance in vector space between a training sample and a mean of category training samples, and based on a variance between an assigned category and a predicted category for a training sample. Suspect or erroneous samples may be selectively removed based on, for example, vector space variance and/or prediction confidence level. As a result, ML model accuracy may be improved by training on a more accurate revised training set. ML model accuracy may (e.g., also) be improved, for example, by identifying and removing suspect categories with excessive (e.g., weighted) vector space variance. Suspect categories may be retained or revised. Users may (e.g., also) specify a prediction confidence level and/or coverage (e.g., to control accuracy).

20 Claims, 8 Drawing Sheets

Related U.S. Application Data continuation of application No. 16/795,353, filed on Feb. 19, 2020, now Pat. No. 11,636,389.

(56) References Cited

U.S. PATENT DOCUMENTS

| | | | |
|---|---|---|---|
| 11,636,387 B2* | 4/2023 | Elisha | G06N 20/00 706/14 |
| 2020/0410387 A1* | 12/2020 | Fox | G06N 3/006 |
| 2021/0064934 A1* | 3/2021 | Swaminathan | G06N 20/00 |
| 2021/0073672 A1 | 3/2021 | Shi et al. | |

OTHER PUBLICATIONS

Communication pursuant to Article 94(3) Received in European Patent Application No. 21705063.2, mailed on Apr. 17, 2025, 08 pages.
Markovitch, et al., "Feature Generation Using General Constructor Functions", Machine Learning, vol. 49, Issue No. 01, Oct. 1, 2002, pp. 59-98.

* cited by examiner

|         | Label 1 ~302 | Label 2 ~304 | Label 3 ~306 |
|---------|---|---|---|
| Label 1 | Number of correct predictions of label 1 ~308 | Number of mistakes predicting label 1 instead of label 2 ~314 | Number of mistakes predicting label 1 instead of label 3 ~320 |
| Label 2 | Number of mistakes predicting label 2 instead of label 1 ~310 | Number of correct predictions of label 2 ~316 | Number of mistakes predicting label 2 instead of label 3 ~322 |
| Label 3 | Number of mistakes predicting label 3 instead of label 1 ~312 | Number of mistakes predicting label 3 instead of label 2 ~318 | Number of correct predictions of label 3 ~324 |

|         | Label 1 ~302 | Label 2 ~304 | Label 3 ~306 |
|---------|---|---|---|
| Label 1 | 5 ~308 | 2 ~314 | 8 ~320 |
| Label 2 | 1 ~310 | 9 ~316 | 2 ~322 |
| Label 3 | 9 ~312 | 1 ~318 | 2 ~324 |

400 —

FIG. 4

SYSTEM AND METHOD FOR IMPROVING MACHINE LEARNING MODELS BY DETECTING AND REMOVING INACCURATE TRAINING DATA

CROSS-REFERENCE TO RELATED APPLICATION

This application is a continuation of pending U.S. patent application Ser. No. 18/185,679, entitled "SYSTEM AND METHOD FOR IMPROVING MACHINE LEARNING MODELS BY DETECTING AND REMOVING INACCURATE TRAINING DATA," which was filed on Mar. 17, 2023, which is a continuation of pending U.S. patent application Ser. No. 16/795,353, entitled "SYSTEM AND METHOD FOR IMPROVING MACHINE LEARNING MODELS BY DETECTING AND REMOVING INACCURATE TRAINING DATA," which was filed on Feb. 19, 2020, both of which are herein incorporated by reference in their entireties.

BACKGROUND

Machine learning (ML) models, such as predictive models, may be trained to make predictions after being trained on training data. For example, ML classification algorithms may predict one or more classes for input data by inference (e.g., processing vectorized input data by an ML model trained on vectorized training data). The quality of predictions (e.g., of one or more classes) made by a trained predictive model depend on the quality of training data. For example, inaccurate training data may lead to inaccurate predictions among multiple possible classifications of input data. Training data may be inaccurately categorized (e.g., labeled or tagged), for example, based on human error, machine bugs (e.g., when saving training data) and/or conflicts (e.g., when different people label or tag training data on the same system).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are described to improve machine learning (ML) model-based classification of data items by identifying and removing inaccurate training data. Inaccurate training samples may be identified, for example, based on excessive variance in vector space between a training sample and a mean of category training samples, and based on a variance between an assigned category and a predicted category for a training sample. Suspect or erroneous samples may be selectively removed based on, for example, vector space variance and/or prediction confidence level. As a result, ML model accuracy may be improved by training on a more accurate revised training set. ML model accuracy may (e.g., also) be improved, for example, by identifying and removing suspect categories with excessive (e.g., weighted) vector space variance. Suspect categories may be retained or revised. Users may (e.g., also) specify a prediction confidence level and/or coverage (e.g., to control accuracy).

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a block diagram of a confusion matrix in accordance with an embodiment.

FIG. 4 shows a block diagram of a confusion matrix in which each of its row elements are populated with exemplary values in accordance with an embodiment.

Figure 1:
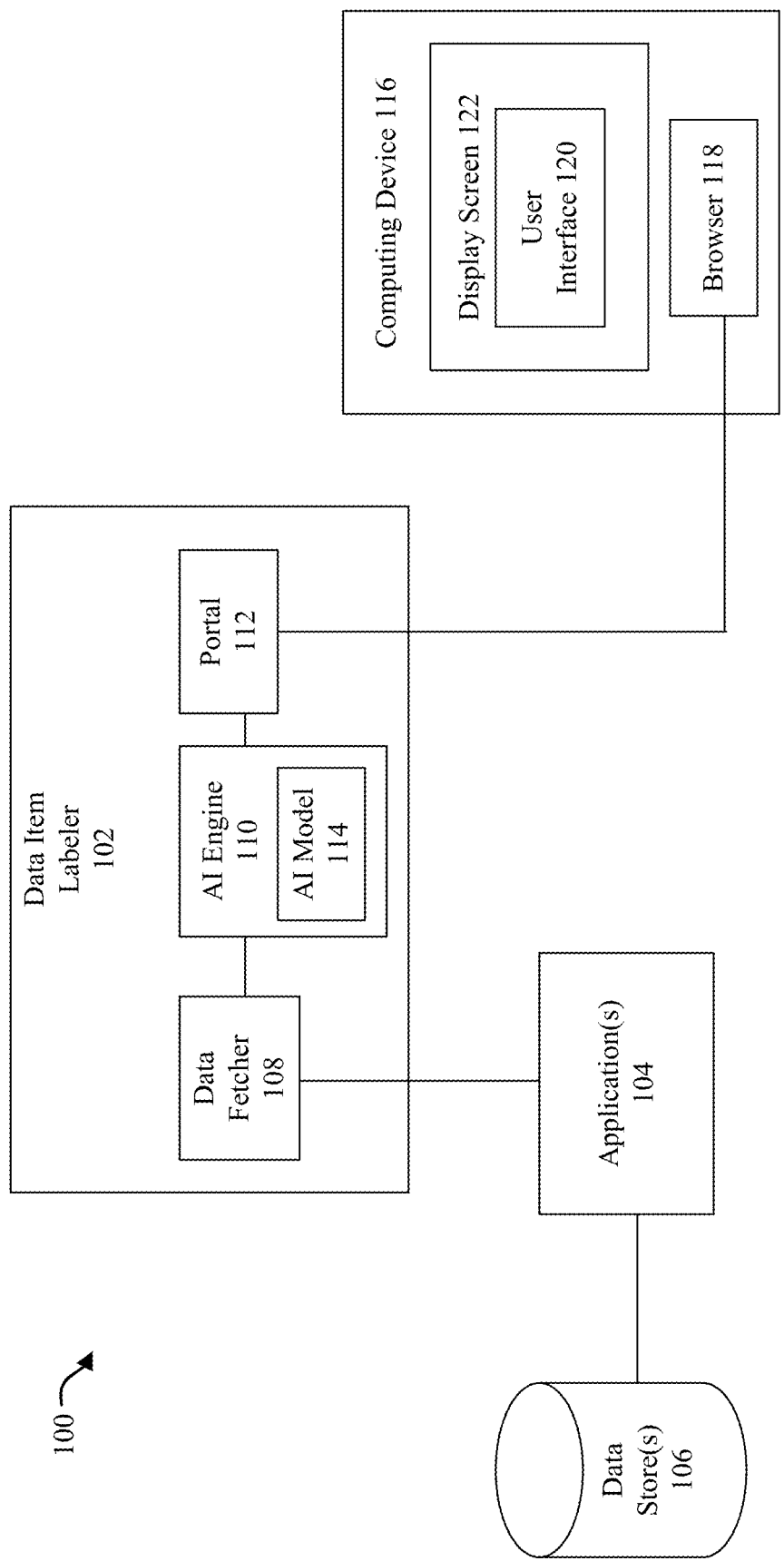
FIG. 1 shows a block diagram of a system for categorizing data items in accordance with an embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Advances in computing have led to increased usage of machine learning to automate many tasks. Machine learning (ML) models may be used, for example, in consumer applications (e.g., web ranking and recommendation systems) and enterprise scenarios, (e.g., applications such as marketing/sales optimization, process automation, preventative healthcare, predictive maintenance, cybersecurity, fraud detection, and so on).

Users or managers of software applications (e.g., e-mail applications, information technology (IT) ticketing applications, customer relationship management (CRM) applications) may use default taxonomies or customized (e.g., user-specific) taxonomies to categorize (e.g., label or tag) data. For example, an IT (information technology) department may use a different taxonomy than a variety of research and development groups or a customer relationship department, e.g., based on their respective preferences or processes. Taxonomies may change over time, e.g., based on new users, processes or regulations. Users or managers who may manually tag data (e.g., messages) may wish to use their tagged data to train an ML model to automatically tag data. Thus, each user or manager may have their own ML model and their own training data to automatically categorize data. Some training data may be inaccurate for a present or future taxonomy. It would be extremely time-consuming (e.g., for each user or manager) to attempt to manually find and correct or eliminate inaccurately tagged data for one or more taxonomies.

Methods, systems and computer program products are described to improve machine learning (ML) model-based classification of data items by identifying and removing inaccurate training data. Inaccurate training samples may be identified, for example, based on excessive variance in vector space between a training sample and a mean of category training samples, and based on a variance between an assigned category and a predicted category for a training sample. Suspect or erroneous samples may be selectively removed based on, for example, vector space variance and/or prediction confidence level. As a result, ML model accuracy may be improved by training on a more accurate revised training set. ML model accuracy may (e.g., also) be improved, for example, by identifying and removing suspect categories with excessive (e.g., weighted) vector space variance. Suspect categories may be retained or revised. Users may (e.g., also) specify a prediction confidence level and/or coverage (e.g., to control accuracy).

The embodiments described herein may advantageously improve the performance of classifier-based machine learning models and the performance of machines consuming data classified by the machine learning models. In particular, the labels (or classifications) generated by such models are more accurate, with fewer inaccurate classifications. Improving the accuracy of a classifier-based machine learning model advantageously improves the functioning of computing devices consuming classified data. In particular, improving classification accuracy advantageously reduces processing cycles of computing devices. Classification consumers may receive more accurate search results, spending fewer computational cycles searching for desired results. Moreover, the storage requirement of such computing devices is also reduced, with fewer inaccurately categorized results. Additionally, applications in which such models are implemented also perform more efficiently, e.g., by returning more accurate results with fewer searches to find desired results.

Moreover, any technological field in which such models are utilized is also improved. For instance, consider a scenario in which a classifier-based machine learning model is used in an industrial process, such as predictive maintenance. The possibility of being able to predict disruptions to the production line in advance of that disruption taking place may be invaluable to the manufacturer. It allows the manager to schedule the downtime at the most advantageous time and eliminate unscheduled downtime. Unscheduled downtime hits the profit margin hard and also can result in the loss of the customer base. It also disrupts the supply chain, causing the carrying of excess stock. A poorly functioning classifier-based machine learning model would improperly predict disruptions, and therefore, would inadvertently cause undesired downtimes that disrupt the supply chain.

Consider another scenario in which a classifier-based machine learning model is used for cybersecurity. A more accurate model would more accurately predict whether code executing on a computing system is malicious and more accurately cause remedial action to occur and cause fewer false alarms.

Consider yet another scenario in which a classifier-based machine learning model is used for autonomous (i.e., self-driving vehicles). Autonomous vehicles can get into many different situations on the road. If drivers are going to entrust their lives to self-driving cars, they need to be sure that these cars will be ready for any situation. What's more, a vehicle should react to these situations better than a human driver would. A vehicle should not be limited to handling a few basic scenarios. A vehicle should learn and adapt to the ever-changing behavior of other vehicles around it. Machine learning algorithms make autonomous vehicles capable of making decisions in real time. This increases safety and trust in autonomous cars. A poorly functioning classifier-based machine learning model may misclassify a particular situation in which the vehicle is in, thereby jeopardizing the safety of passengers of the vehicle.

Consider a further scenario in which a classifier-based machine learning model is used in biotechnology for predicting a patient's vitals or whether a patient has a disease. A poorly functioning classifier-based machine learning model may misclassify the vitals and/or the disease. In such a case, the patient may not receive necessary treatment.

These examples provide a small sampling of technologies that would be improved with more accurate classifier-based machine learning models, such as those disclosed herein.

For instance, FIG. 1 shows a block diagram of a system 100 for categorizing data items in accordance with an embodiment. As shown in FIG. 1, system 100 includes a data item labeler 102, one or more application(s) 104, one or more data store(s) 106, and a computing device 116. Data item labeler 102 may be implemented on one or more computing devices, such as one or more servers that may be coupled to computing device 116 over a network. Data item labeler 102 may comprise a data fetcher 108, an artificial intelligence (AI) engine 110, and a portal 112. Each of application(s) 104 may be coupled to a respective data store of data stores(s) 106. Each of data store(s) 106 may comprise one or more databases or other storage devices. Examples of application(s) 104 include but are not limited to an e-mail application (e.g., Microsoft Outlook™), a customer relationship management (CRM) application (e.g., Microsoft Dynamics 365™), an information technology (IT) ticketing application, etc. Data store(s) 106 may be configured to store data items associated with application(s) 104 (e.g., e-mails, IT ticketing messages, sales information, banking data, marketing data, social media data, etc.).

Data item labeler (e.g., categorizer) 102 is configured to automatically label data items (e.g., for a user). A user may comprise, for example, an application user or an application manager (e.g., for multiple users), such as a department manager for email, CRM and/or IT applications. A user may opt-in to have data item labeler 102 automatically categorize (e.g., label or tag) data items with one or more categories. Data item analyzer 102 may configure, train and continuously improve one or more models to infer categories for data items.

Data items may be labeled based on an analysis of training data items with user-generated labels. Retrieved data items may comprise, for example, training data, which may be manually labeled by a user, and/or inference data, which may be automatically labeled by a trained model. For instance, data fetcher 108 may be configured to retrieve data items from data store(s) 106 via application(s) 104. In an embodiment, data fetcher 108 provides a request to application(s) 104 for the data items. In another embodiment, data fetcher 108 retrieves the data items directly from data store(s) 106. The retrieved data items are provided to AI engine 110.

AI engine 110 may be configured to extract various pieces of information (or features) from each of the data items. A user may specify configuration parameters for an AI model, for example, using portal 112. A user may (e.g., during model configuration), select which data item information to vectorize and may select coverage, indicating what percentage of messages an AI model should categorize. Data item labeler 102 may (e.g., based on selected coverage) set a threshold for a confidence level of prediction, where a new message may be categorized (e.g., only) when the confidence level associated with a category prediction is above a confidence threshold. Data items with category prediction confidence levels below a threshold may be uncategorized, e.g., a default 'no_class' category. A user may (e.g., alternatively and/or additionally), at any time (e.g., during model configuration), select a threshold for a confidence level of prediction, where a new message may be categorized (e.g., only) when the confidence level associated with a category prediction is above a confidence threshold. Data item labeler 102 may (e.g., based on selected confidence level) set a coverage, indicating what percentage of messages an AI model can categorize to achieve the selected confidence level. Data items with category prediction confidence levels below a threshold may be uncategorized, e.g., a default 'no_class' category.

Information extracted from data items may be analyzed to determine patterns and aggregated aspects that are similar between a plurality of different data items. For example, common textual patterns (i.e., templates) and key phrases from various fields of the data items are determined. Examples of fields from which features are extracted include but are not limited to, a sender address field, a timestamp field, textual fields (e.g., a subject field, a body field, a description field, etc.), platform (or application)-specific fields, metadata fields, attachments, etc. Examples of features that are extracted from a sender address field include, but are not limited to, the most frequent senders, each sender's frequency, affiliations of a sender (e.g., @microsoft.com, @gmail.com, etc.), etc. An example of a feature that may be extracted from a time stamp field includes, but is not limited to, the arrival time of messages. Examples of features that may be extracted from textual fields include, but are not limited, repeating textual patterns (e.g., templates), key phrases that appear frequently in the textual fields, frequencies of words and/or characters in the textual fields, etc. Examples of features that may be extracted from platform specific fields include, but are not limited to, the percentage of replied messages, an average number of people on a message thread, etc. Extracted features may be vectorized. In an example, one or more tables may be created with (e.g., numerical) values.

After an AI model is configured and information from retrieved data items is extracted and vectorized, AI engine 110 may train an AI model 114 (e.g., based on training data) to automatically label any given data item (e.g., uncategorized data items) based on the extracted and vectorized training information. Training data items may have a predefined category field filled in with a category. Training data items may be divided into subsets to be used for training and validation of AI model 114. AI model 114 may be trained and validated based on subsets of data items having predetermined categories (e.g., labels or tags).

Categories to be used to automatically label data items may be designated by a user via portal 112. A user may access portal 112 via computing device 116. A user may access portal 112 by interacting with an application at computing device 116 capable of accessing portal 112. For example, the user may use browser 118 to traverse a network address (e.g., a uniform resource locator) to portal 112, which invokes a user interface 120 (e.g., a web page) in a browser window rendered on a display screen 122 coupled to computing device 116. By interacting with user interface 120, the user may utilize portal 120 to designate labels for data items to be received and cause AI engine 110 to train AI model 114, among other things. Computing device 116 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer).

Portal 112 may provide a user interface to browser 118. Through portal 112, a user may be provided a list of user-generated labels associated with the different data items retrieved by data fetcher 108. The user may select which labels in the list (e.g., and which fields in messages) are to be utilized for building and training AI model 114. Upon selecting the labels, the user may cause AI engine 110 to train AI model 114, e.g., by interacting with a user-interactive element (e.g., a "Train" button in a user interface) provided via portal 112. Upon interacting with the user-interactive element, data fetcher 108 may be configured to retrieve the data items from data stores(s) 106 that are associated with the selected labels. A first portion of the data items and their associated user-generated labels may be utilized to train AI model 114. A second portion of the data items may be utilized to validate AI model 114. In accordance with an embodiment, AI model 114 may be trained in accordance with a supervised machine learning algorithm that learns which label to apply to a particular data item based on the extracted features of data items (as described above), the first portion of data items and their associated-user generated labels.

New (e.g., uncategorized) data items may be received via application(s) 104, for example, after AI model 114 is trained. New data items and/or otherwise uncategorized data items may be fetched by data fetcher 108. Features of a (e.g., each) new data item may be extracted and transformed (e.g., by AI engine 110) into one or more (e.g., numerical) vectors that quantify the contributions of each feature. A vectorized data item may be provided as an input to AI model 114, which predicts one or more classifications (e.g., categories or labels) for each data item. AI model 114 may comprise one or more multi-classification models that predict one or more categories. A (e.g., each) predicted category may be accompanied by or associated with a (e.g., an accuracy) confidence level (e.g., generated by AI model 114). In an example, a confidence level may be a value between 0.0 and 1.0. In an example, a lower value may be associated with a lower confidence level and a relatively higher value may be associated with a higher confidence level. A predicted category and/or confidence level may be provided to data fetcher 108. Data fetcher 108 may determine whether the confidence level is above a predetermined threshold. Data fetcher 108 may provide the predicted label to application(s) 104, for example, when a confidence level is above or equal to a predetermined threshold. Application(s) 104 may apply the label to the data item. Data fetcher 108 may not provide a predicted label to application(s) 104, and the data item is not labeled, for example, when a confidence level associated with the predicted label is below the predetermined threshold.

Continuous improvement may (e.g., periodically) improve (e.g., optimize) performance of AI model 114. Continuous improvement may be instigated automatically or by a user. A re-training process may occur. Inaccurately tagged training messages may be searched for, identified and removed or relabeled to improve the accuracy of AI model 114. Additionally, labels may be changed over time (e.g., when a manager decides to add or remove labels). Some labels (e.g., created by different labelers, typos, miscommunication) may have the same meaning with a different name (e.g., 'purchase order' and 'PO'). These issues may influence the performance of AI model 114 (e.g., potentially causing prediction errors).

Continuous improvement pertains to improving an (e.g., a user-specific) AI model based on one or more aspects, such as newly added data, category changes (e.g., by a user), re-discovery, re-training, identifying and correcting suspect categories and training samples.

Regarding newly added data, over time, new messages may arrive and may (e.g., based on a user's request) need to be categorized. Utilization of discovery and training stages with fresh data may produce an updated AI model that may make better predictions (e.g., on current and future data). For example, a user may be an IT department. In an example, the IT dept. may have successfully implemented new anti-virus software. Many new messages may be received regarding this topic. These new messages may be added to the model to accurately predict similar messages.

Regarding category changes by a user, user changes, such as a correction of one or more categories, may be used to improve model performance.

Re-discovery may occur, for example, after a period of time. Re-discovery may involve optimization of discovery parameters for a (e.g., each) specific user. Re-discovery may be performed, for example, on a server without interrupting a user's experience. A re-discovery parameter may be chosen, for example, based on a feature's importance. Other parameters may be optimized, for example, using an iterative scheme.

Re-training may occur, for example, automatically and/or at a user's request. Retraining may use different subsets of data items for training and validation.

Suspect categories and/or training samples may be identified and corrected or removed (e.g., periodically or at any time). Some categories may be suspect (e.g., may cause performance issues). For example, some categories may share similar definitions. In an example, a message regarding "Installing anti-virus software on a new PC" may be categorized as both "Software support" (installing an anti-virus software) and "Purchase order." Such issues may be resolved, for example, in a label selection process.

Some training samples may be suspect. For example, inaccurately tagged data may be discovered while training an AI model on training data. Training data may be automatically tagged and/or manually tagged by a user. Mistakes may occur (e.g., human error or machine bug). Errors in training data may confuse an AI model. Eliminating errors may produce a more accurate model. An (e.g., automated) algorithm may identify (e.g., and may remove) inaccurately tagged messages. Training data may comprise a significant number of data items. It may be extremely time-consuming to re-evaluate a significant number of training data items to reconsider their associated (e.g., tagged) categories (e.g., labels). Suspect labels may be found, for example, by evaluating training samples in a category. A user may provide one or more selections that may be used to determine which suspect training samples to eliminate from a training set. For example, a user may directly or indirectly select a number or estimated percentage of suspect (e.g., potentially incorrectly tagged) messages to remove.

Embodiments described herein may be configured to identify suspect categories (e.g., labels) and training samples, resolve the problematic labels and/or samples, and improve an AI model, for example, by retraining the AI model based on the resolutions of the suspect labels and/or samples.

Suspect training samples may be identified during training, for example, in a category-level evaluation of training samples tagged with the category (e.g., label). In an example, each training data item (e.g., a message) associated with a category may be transformed into a vectorized message (e.g., referred to as a sample) in a high dimensional hyper-plane. In an example, for each category, a mean of all samples in the hyper-plane (e.g., creating a category mean) and a similar element to the variance may be calculated to evaluate samples (e.g., "similar element to the variance" refers to the use of a similar formula (e.g., averaged sum of distances from the mean squared) to calculate but that uses a different distance measure that takes in account the variable importance, thereby generating a weighted distance measure automatically designed for each user with better performance). Samples with a (e.g., significant) variance from the category mean that exceeds one or more thresholds may be flagged as suspect samples for the category. Suspect samples may be samples that are inaccurately or invalidly tagged with a category or that are valid (e.g., although abnormal) samples. Valid samples may be retained while invalid samples may be removed from a training set. AI model performance may be improved either way (e.g., with suspect samples turning out to be valid or invalid).

In an example, suspect training samples may be identified by a trained generalization AI model (e.g., a separate model such as a suspect sample model in addition to a data item classifier). Suspect training samples may be identified, for example, prior to training the data item classifier. A threshold T1 may be used to determine whether a training sample is suspect and/or an outlier. Outliers may be removed, for example, prior to training the classifier (e.g., using k-fold cross validation). An array of confidences for an array of predictions may be calculated during a cross-validation loop. The confidences may be utilized, for example, during coverage analysis (e.g., based on user input of confidence and/or coverage for inference).

Suspect training samples may be automatically or manually selected for elimination from a training set. Automated elimination may be based on, for example, user input (e.g., one or more configurations or selections provided by a user). For example, suspect training samples may be (e.g., automatically) eliminated based on a user-specified value or threshold. A user may, for example, select a number or percentage of outliers (e.g., via portal 112) that are permissible or that should be removed. Data item labeler 102 may remove outlier training samples (e.g., starting from the top of a descending list of outliers to eliminate the top outliers first). Re-training and re-validation of a model may follow removal of suspect training samples from an AI model training set (e.g., to produce a more accurate AI model).

Data items (e.g., messages) may be categorized based on a coverage or confidence level evaluation, for example, to maintain or increase model performance accuracy. A user may indicate, for example, a number or percentage of messages that an AI model should categorize (e.g., during an inference stage of operation) and/or may specify a prediction confidence level or threshold required to categorize data items (e.g., during an inference stage of operation). In an example, a user may be confident that the AI model built based on training samples provided by the user is accurate.

A user may select (e.g., in a user interface provided through portal 112) that data item labeler 102 should categorize 95% of data items (e.g., incoming messages). Data item labeler 102 may, for example, select a corresponding prediction confidence level threshold that corresponds to (e.g., is based on) the desired coverage level. The trained AI model may categorize data items (e.g., only) when a confidence level associated with a category predicted for a data item meets or exceeds a confidence level threshold. Predictions with confidence levels below a threshold may not lead to categorization of a data item. Accordingly, the selected percentage of messages categorized may (e.g., will) be categorized with an accuracy meeting or exceeding the confidence level threshold. There may be a tradeoff between coverage and accuracy. For example, selecting more coverage may translate into lower accuracy (e.g., with some data items being categorized with lower confidence levels) and vice versa.

In an example, AI model 114 may determine whether the confidence level of an inferred category for a data item is equal to or higher than a threshold T2 (e.g., set by a correlated coverage level). A predicted label may be returned, for example, when the predicted label confidence level is equal to or higher than threshold T2. Otherwise, a default label (e.g., not categorized) may be returned for a data item.

Figure 2:
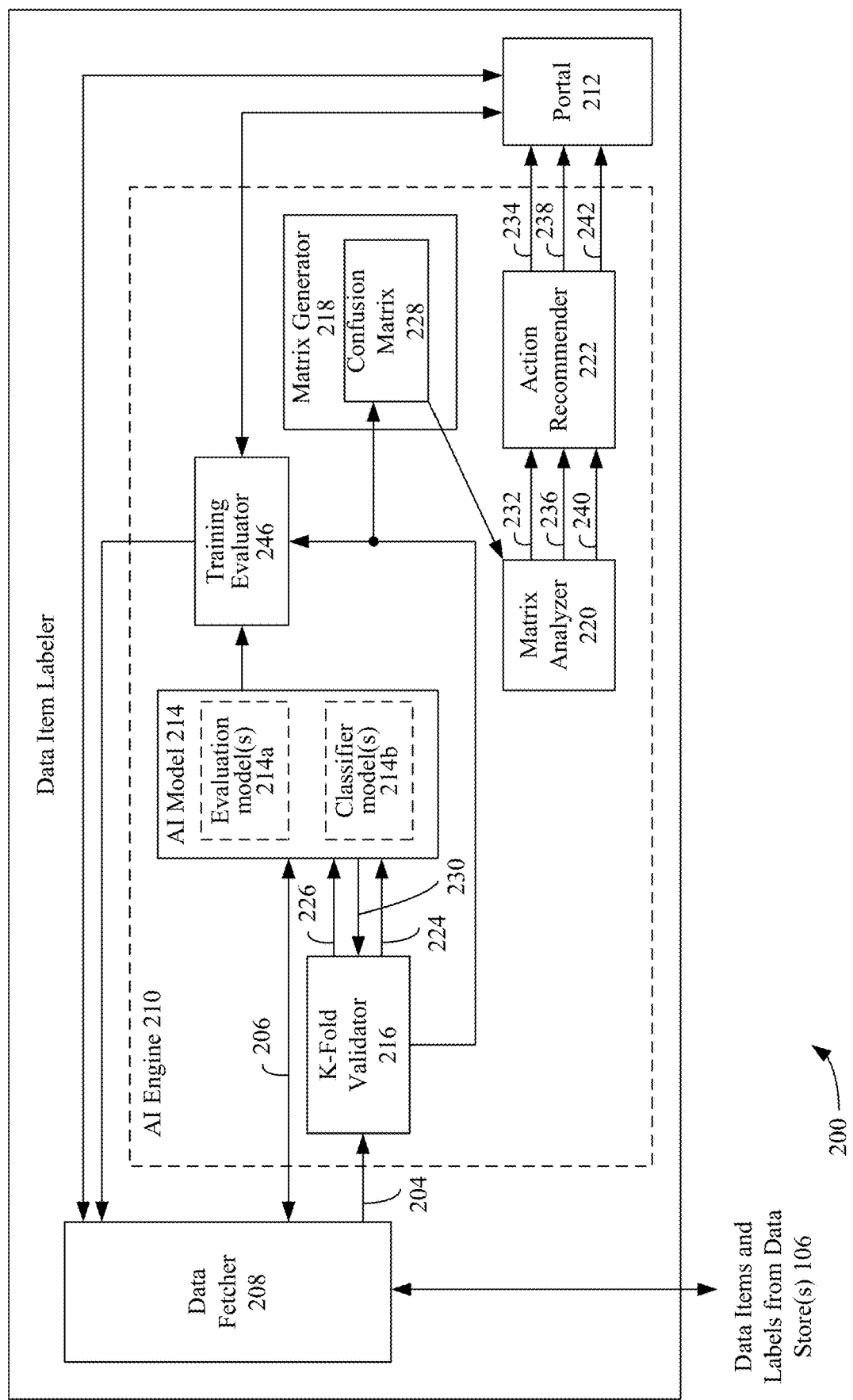
FIG. 2 shows a block diagram of a data item labeler configured to identify and remove suspect categories and category training samples in accordance with an embodiment.

FIG. 2 shows a block diagram of a data item labeler 200 configured to identify and remove suspect categories and category training samples in accordance with an embodiment. FIG. 2 presents one example of many possible implementations to improve AI model performance by identifying and selectively removing suspect (e.g., potentially inaccurately labeled) AI model training data and suspect categories.

Data item labeler 200 is an example of data item labeler 102, as described above with reference to FIG. 1. As shown in FIG. 2, data item labeler 200 comprises a data fetcher 208, an AI engine 210, and a portal 212. Data fetcher 208, AI engine 210, and portal 212 are examples of data fetcher 108, AI engine 110, and portal 112, as described above with reference to FIG. 1. As also shown in FIG. 2, AI engine 210 comprises an AI model 214, a k-fold validator 216, a matrix generator 218, a matrix analyzer 220, and an action recommender 222. AI model 214 is an example of AI model 114, as described above with reference to FIG. 1.

AI model 214 may comprise multiple models, such as one or more classifier model(s) 214b (e.g., to be trained for classifying data items) and one or more evaluation model(s) 214a (e.g., to detect suspect training samples). Models may be automatically and/or manually selected for training and operation. One or more models may be trainable. In an example, a classification model(s) 214b and evaluation model(s) 214a may be trainable. Evaluation model(s) 214a may be trained and operated before classification model(s) 214b is (are) trained and operated.

Data fetcher 208 may retrieve data items from data store(s) 106 for training and inference by AI model 214. Data items fetched by data fetcher 208 may be inference data (e.g., uncategorized or "new" data items to be categorized by classifier model(s) 214b) or training data 204 (e.g., training data items with assigned labels to train or be evaluated by evaluation model(s) 214a). A user may select labels of data items to be retrieved from data store(s) (e.g., data store(s) 106). Data fetcher 208 may use the selected labels to determine which training data to load.

Data fetcher 208 may retrieve training data 204 (e.g., having labels matching labels selected for categorization) to train AI model 214 (e.g., classifier model(s) 214a). Data fetcher 208 may provide training data 204 to AI engine 210. AI engine 210 may vectorize data items in training data 204 and in inference data 206. K-fold validator 216 may be configured to separate training data 204 into k datasets, where k is any positive integer. In an example, the value of k may be 10. K-fold validator 216 may designate a dataset as validation set 224 (e.g., for use in validating AI model 214). K-fold validator 216 may designate remaining (e.g., k−1) datasets as training set(s) 226 (e.g., for use in training AI model 214). During multiple training and validation stages, a training data item may variously be in training set 226 or validation set 224.

AI engine 210 may evaluate training data 204 (e.g., training set 226 and validation set 224) using evaluation model(s) 214a. AI engine 210 may train classifier model(s) 214b using training set 226. AI engine 210 may provide as input to AI model 214 validation set 224 to test the classification accuracy of the trained version of classifier model(s) 214b. The accuracy and stability (e.g., standard deviation) may be presented to a user via portal 212. After training (e.g., and validation), a user may select 'Train' again, for example, to train a new model with different categories and configuration or re-train the same model. Accuracy may be improved by re-training an AI model, where retraining may occur by user request and/or automatically (e.g., after a period of time or use of the model).

Evaluation model 214a and K-fold validator 216 may provide information to training evaluator 246 (e.g., as part of an algorithm that evaluates training data 204). Training evaluator 246 may evaluate training data 204, for example, to determine whether any data items have suspect labels that may need further evaluation (e.g., to determine whether assigned training labels are inaccurate). Training evaluator 246 may identify potentially inaccurately tagged (e.g., suspect) samples in a training set (e.g., based on abnormal variations from a category mean). Training evaluator 246 may determine an average vector location for samples in a category, determine an average vector space variation from the average category vector and determine whether a (e.g., each) sample falls within a threshold variation from the average vector location for samples in the category.

Training evaluator 246 may function as a training data and classification category cleaner. Classifier model(s) 214b may be trained on training data 204 that may be cleaned or corrected by training evaluator 246.

Training evaluator 246 may process training data 204 for each category to identify and evaluate suspect categories and suspect vectorized training data items (e.g., samples) with suspect labels. Training evaluator 246 may identify correctly tagged and incorrectly tagged (e.g., outlier) training samples, for example, based on additional information and one or more thresholds. For example, a (e.g., each) vectorized training data item (sample) in validation set 224 may be classified by (e.g., trained) classifier model(s) 214a, such that each training data item may have both an assigned training label and classifier label. K-fold validator 216 may identify a (e.g., each) training sample with a conflict between the training sample's assigned training label and assigned classifier label (e.g., assigned by trained classifier model(s) 214a). K-fold validator 216 may provide at least the conflicts to training evaluator 246 for evaluation of suspect training samples identified by evaluation model(s) 214a.

Evaluation model(s) 214a may comprise, for example, a trained generalization AI model providing a function in an algorithm configured to improve a training data set. For example, evaluation model(s) 214a may classify training samples created from training data 204

A (e.g., each) vectorized training data item (sample) in validation set 224 may be classified by (e.g., trained) evaluation model(s) 214a, such that each training data item may have both an assigned training label and classifier label. K-fold validator 216 may identify a (e.g., each) training sample with a conflict between the training sample's assigned training label and assigned classifier label (e.g., assigned by evaluation model(s) 214a). K-fold validator 216 may provide at least the conflicts to training evaluator 246 for evaluation of suspect training samples identified by training evaluator 246.

Training evaluator 246 may identify outlier training samples among suspect samples. Training evaluator 246 may remove outliers, for example, according to input provided by a user via portal 212. An input may comprise a threshold T1 to determine whether a suspect sample is categorized correctly or an outlier that should be removed from a training set. In an example, threshold T1 may indicate a number or percentage of outliers permissible in a training set. A user may set (e.g., select or specify) threshold T1 via portal 212. Training evaluator 246 may (e.g., based on knowledge about which samples are accurately tagged for a category) identify suspect categories (e.g., with widely dispersed samples), which may lead to a suggestion to a user via portal 212 to revise or eliminate a category. Additional examples of operation of training evaluator 246 and evaluation model(s) 214a and training evaluator 246 are discussed with respect to FIGS. 6 and 7.

Trained classifier model(s) 214b may be validated, for example, by inferring (e.g., generating) a label 230 for each data item in validation set 224. K-fold validator 216 may compare (e.g., for each data item in validation set 224) the classifier model-generated label 230 to a user-generated label for a data item, for example, to determine mispredictions between two different labels. In an embodiment, K-fold validator 216 may include a label comparator configured to perform the comparison. Mispredictions between each distinct pair of labels of machine learning model-generated labels 230 may be summed and saved. Such mispredictions may be referred to as confusion metrics, which may be used for multiple purposes pertaining to identifying suspect categories and training samples. The number of correct predictions for a particular machine learning model-generated label may (e.g., also) summed and saved. The training and validation process may be repeated a total of k times, where, each time, validation set 224 comprises a different dataset of the k sets and the training set 226 comprises the remaining k−1 datasets. The mispredictions between each distinct pair of labels of machine learning model-generated labels 230 are accumulated over the k iterations. The number of correct predictions for a particular machine learning model-generated label are also accumulated over the k iterations. This information may be used to identify suspect categories and training samples.

It is noted that while the confusion metrics described herein may indicate whether a particular label is being mistaken for another particular label, the confusion metrics may also indicate a degree to which a particular label is being mistaken for another particular label, a frequency with which a particular label is being mistaken for another particular label, whether training samples may be incorrectly categorized, etc.

Matrix generator 218 may be configured to generate a confusion matrix 228 based on the accumulated mispredictions (i.e., confusion metrics) and correct predictions. For example, FIG. 3 shows a block diagram of a confusion matrix 300 in accordance with an embodiment. Confusion matrix 300 is an example of confusion matrix 228, as shown in FIG. 2. As shown in FIG. 3, confusion matrix 300 comprises a plurality of columns 302, 304, and 306 that are each associated with a particular label. Each of columns 302, 304, and 306 include a plurality of row elements. For example, column 302 comprises row element 308, row element 310, and row element 312. Column 304 comprises row element 314, row element 316, and row element 318. Column 306 comprises row element 320, row element 322, and row element 324. It is noted that while confusion matrix 300 is generated for three labels, a confusion matrix may be generated for any number of labels.

Row element 308 comprises the number of correct predictions of label 1 over the k iterations. Row element 310 comprises the number of mistakes predicting label 2 instead of label 1 over the k iterations. Row element 312 comprises the number of mistakes predicting label 3 instead of label 1 over the k iterations. Row element 314 comprises the number of mistakes predicting label 1 instead of label 2 over the k iterations. Row element 316 comprises the number of correct predictions of label 2 over the k iterations. Row element 318 comprises the number of mistakes predicting label 3 instead of label 2 over the k iterations. Row element 320 comprises the number of mistakes predicting label 1 instead of label 3 over the k iterations. Row element 322 comprises the number of mistakes predicting label 2 instead of label 3 over the k iterations. Row element 324 comprises the number of correct prediction so label 3.

Referring again to FIG. 2, matrix analyzer 220 may be configured to analyze confusion matrix 228 (or confusion matrix 300, as shown in FIG. 3) to determine a confusion metric (that is indicative of mispredictions) for each distinct pair of labels and identify one or more of the plurality of machine learning model-generated labels that are problematic. Based on the analysis, matrix analyzer 220 may determine whether two labels are problematic (e.g., two labels similar (or have a conflict), whether a label is weak, or whether a label disturbs another label).

To determine whether label is similar, matrix analyzer 220 may analyze confusion matrix 228/300 to determine whether the values of row elements comprising values of the number of mistakes between two labels is above a predetermined threshold.

For example, FIG. 4 shows a block diagram of a confusion matrix 400 in which each of its row elements are populated with exemplary values in accordance with an embodiment. As shown in FIG. 4, row elements 312 and 320 each comprise a high number of mispredictions between labels 1 and 3 (i.e., both values are above a predetermined threshold). Based on these values, matrix analyzer 220 may determine that labels 1 and 3 are in conflict with (or similar to) each other. Examples of such labels include, but are not limited, labels that are spelled the same but have mismatched cases (e.g., "Purchase Orders" vs. "purchase orders"), labels that have typographical errors (e.g., "software support" vs. "software support"), etc. Upon determining that two labels are similar or confusing, matrix analyzer 220 may provide a notification 232 to action recommender 222 that indicates that two labels that are similar or confusing (e.g., labels 1 and 3).

Action recommender 222 causes a recommendation 234 for resolving the similar or confusing labels to be displayed to a user via portal 212 based on notification 232. For instance, recommendation 234 may be displayed via a web page rendered by browser 118, as described above with reference to FIG. 1. Recommendation 234 may indicate that the two confusing or similar labels should be merged. For instance, recommendation 234 may specify that one of the two labels should be removed or deleted.

The user may remove the label(s) from consideration via portal 212. After removing the label(s), the user may cause AI model 214 to be retrained without the removed label(s) (e.g., by interacting with a user-interactive element that initiates the retraining of AI model 214).

Weak labels may be labels that are rarely predicted or inferred and other labels were frequently inferred instead. This means that the label is easily interrupted and miscategorized. To determine whether labels are weak, matrix analyzer 220 may analyze a sum of mispredictions across a particular label's column (each row element in that label's column) and determine whether the sum is greater than or equal to a predetermined threshold. In accordance with an embodiment, matrix analyzer 220 may determine whether a label is weak in accordance with Equations 1 and 2, which are shown below:

$$\text{off diagonal} = \sum_{i=1}^{\#labels} \sum_{j=1}^{\#labels} CM_{i,j} - \sum_{i=1}^{\#labels} CM_{i,i} \qquad \text{(Equation 1)}$$

$$\text{Weakness of label } j = \frac{\left(\sum_{i=1}^{\#labels} CM_{j,i}\right) - CM_{j,j}}{\text{off diagonal}} \qquad \text{(Equation 2)}$$

where CM represents the generated confusion matrix (e.g., confusion matrix 228/230), and i represents a column number of the confusion matrix, and j represents a row number of the confusion matrix.

Equation 1 is used to calculate the sum of mispredictions stored in each row element that are off diagonal (i.e., the sum of row elements 314, 320, 310, 322, 312, and 318). Equation 2 calculates the weakness of a particular label j based on the sum of each of the elements of that label's column divided by the value calculated via Equation 1. For example, to determine the weakness of Label 1, the values of row elements 308, 310, and 312 are summed (minus the diagonal element of that label) and divided by the off diagonal value calculated via Equation 1. To determine the weakness of Label 2, the values of row elements 314, 316, and 318 are summed (minus the diagonal element of that label) and divided by the off diagonal value calculated via Equation 1. To determine the weakness of Label 3, the values of row elements 320, 322, and 324 are summed (minus the diagonal element of that label) and divided by the off diagonal value calculated via Equation 1. If the weakness of a particular label is greater than or equal to a predetermined threshold, matrix analyzer 220 may determine that the label is weak. If the weakness of a particular label is less than the predetermined threshold, matrix analyzer 220 may determine that the label is not weak.

Upon determining that a label is weak, matrix analyzer 220 may provide a notification 236 to action recommender 222 that specifies the label determined to be weak.

Action recommender 222 causes a recommendation 238 for resolving the weak labels to be displayed to a user via portal 212 based on notification 236. For instance, recommendation 238 may be displayed via a web page rendered by browser 118, as described above with reference to FIG. 1. Recommendation 238 may indicate that the weak label should be removed or deleted.

The user may remove the label(s) from consideration via portal 212. After removing the label(s), the user may cause AI model 214 to be retrained without the removed label(s)

(e.g., by interacting with a user-interactive element that initiates the retraining of AI model 214).

Disturbing labels may be categories that are frequently predicted or inferred incorrectly instead of other correct categories. To determine whether labels are disturbing, matrix analyzer 220 may analyze a sum of mispredictions across a particular label's row and determine whether the sum is greater than or equal to a predetermined threshold. In accordance with an embodiment, matrix analyzer 220 may determine whether a label is weak in accordance with Equation 3, which is shown below:

$$\text{Distrubance of label } j = \frac{\left(\sum_{i=1}^{\#labels} CM_{i,j}\right) - CM_{j,j}}{\text{off diagonal}} \quad \text{(Equation 3)}$$

Equation 3 calculates the disturbance of a particular label j based on the sum of that label's row elements divided by the value calculated via Equation 1. For example, to determine the disturbance of Label 1, the values of row elements 308, 314, and 320 are summed (minus the diagonal element of that label) and divided by the off diagonal value calculated via Equation 1. To determine the disturbance of Label 2, the values of row elements 310, 316, and 322 are summed (minus the diagonal element of that label) and divided by the off diagonal value calculated via Equation 1. To determine the disturbance of Label 3, the values of row elements 312, 318, and 324 are summed (minus the diagonal element of that label) and divided by the off diagonal value calculated via Equation 1. If the disturbance of a particular label is greater than or equal to a predetermined threshold, matrix analyzer 220 may determine that the label disturbs another label. If the disturbance of a particular label is less than the predetermined threshold, matrix analyzer 220 may determine that the label does not disturb another label.

Upon determining that a label is disturbing, matrix analyzer 220 may provide a notification 240 to action recommender 222 that specifies the label determined to be disturbing.

Action recommender 222 causes a recommendation 242 for resolving the disturbing label to be displayed to a user via portal 212 based on notification 240. For instance, recommendation 242 may be displayed via a web page rendered by browser 118, as described above with reference to FIG. 1. Recommendation 242 may specify that the user is to add additional data items to enrich the data with samples of this disturbing label. For instance, recommendation 242 may instruct the user to manually classify more data items that belong to this category.

For example, suppose a case labeled "Employee transfer" involves moving an employee and his or her equipment ("Hardware issue") to a new work environment, installing new software relevant to his or her new job (which can be associated with another label "Software issue") and possibly supplying him with new equipment (which can be associated with yet another label "Purchase order"). To determine the difference between "Employee transfer", "Software issue," and "Purchase order," and ensure there are no conflicts of predicting "Employee transfer" many times over "Software issue," and "Purchase order," the user may be recommended to add more of these items so the AI model 214 can learn how to differentiate between the cases better.

After the user provides additional data items, the user may cause AI model 214 to be retrained using the additional data items (e.g., by interacting with a user-interactive element that initiates the retraining of AI model 214).

Figure 5:
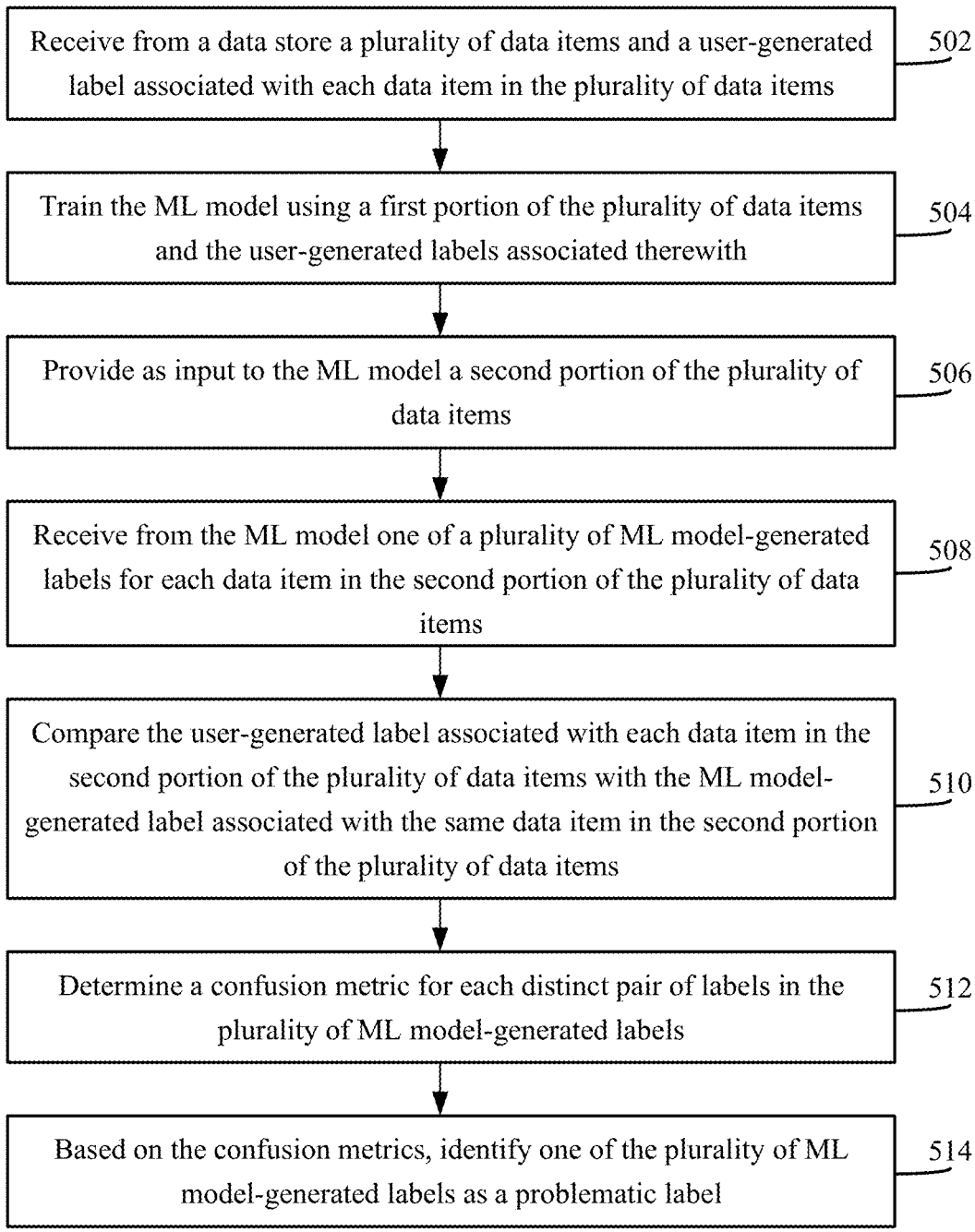
FIG. 5 shows a flowchart of a method for identifying problematic labels in accordance with an example embodiment.

Accordingly, problematic machine learning model-generated labels may be identified in many ways. For example, FIG. 5 shows a flowchart 500 of a method for identifying problematic labels, according to an example embodiment. In an embodiment, flowchart 500 may be implemented by data item labeler 200, as shown in FIG. 2. Accordingly, flowchart 500 will be described with continued reference to FIG. 2. Other structural and operational embodiments will be apparent to persons skilled in the relevant art(s) based on the following discussion regarding flowchart 500 and data item labeler 200 of FIG. 2.

Flowchart 500 of FIG. 5 begins with step 502. In step 502, a plurality of data items and a user-generated label associated with each data item in the plurality of data items is received from a data store. For example, with reference to FIG. 2, data fetcher 208 retrieves data items and their associated user-generated labels from a data store (e.g., data store(s) 106, as described above with reference to FIG. 1). A user may designate the labels of data items that are to be retrieved via portal 212.

In accordance with one or more embodiments, the plurality of data items comprises at least one of e-mails, customer relationship management application-related messages, or support ticketing system-related messages.

After receiving the plurality of data items, a machine learning model is validated via steps 504, 506, 508, and 510, as will be described below. Steps 504, 506, 508, and 510 may be performed a k number of times, where k is any positive integer.

In step 504, the machine learning model is trained using a first portion of the plurality of data items and the user-generated labels associated therewith. For example, with reference to FIG. 2, AI model 214 is trained using a first portion of the plurality of data items (e.g., training set 226).

In step 506, a second portion of the plurality of data items is provided as input to the machine learning model. For example, with reference to FIG. 2, a second portion of the plurality of data items (e.g., validation set 224) is provided as input to AI model 214.

In step 508, one of a plurality of machine learning model-generated labels for each data item in the second portion of the plurality of data items is received from the machine learning model. For example, with reference to FIG. 2, K-fold validator 216 receives from AI model 214 one of a plurality of ML model-generated labels 230 for each data item in validation set 224.

In step 510, the user-generated label associated with each data item in the second portion of the plurality of data items is compared with the ML model-generated label associated with the same data item in the second portion of the plurality of items. For example, with reference to FIG. 2, K-fold validator 216 compares the user-generated label associated with each data item in validation set 224 to ML model-generated label 230 associated with the same data item in validation set 224.

In step 512, based on the validating of the machine learning model, a confusion metric for each distinct pair of labels in the plurality of machine learning model-generated labels is determined. For example, K-fold validator 216 determines a confusion metric for each distinct pair of labels in the plurality of machine learning model-generated labels and provides the confusion metrics to matrix generator 218, which stores the confusion metrics in confusion matrix 228.

In step 514, based on the confusion metrics, one of the plurality of machine learning model-generated labels is identified as a problematic label. For example, with reference to FIG. 2, matrix analyzer 222 identifies one of the plurality of machine learning model-generated labels 230 as a problematic label based on analyzing the confusion metrics of confusion matrix 228.

In accordance with one or more embodiments, the one of the plurality of machine learning model-generated labels is identified as being in conflict with another label of the plurality of ML model-generated labels.

In accordance with one or more embodiments, responsive to identifying the one of the plurality of ML model-generated labels as problematic, the problematic label is merged with the other label that is in conflict with the problematic model and the machine learning model is retrained after the merge. For example, with reference to FIG. 2, action recommender 222 may provide a recommendation 234 based on notification 232 that recommends that the identified problematic label should be merged. The user may merge the problematic label with the label that it conflicts with and cause AI engine 210 to retrain AI model 214 accordingly via portal 212.

In accordance with one or more embodiments, the one of the plurality of machine learning model-generated labels is identified as a relatively weak label such that other labels of the plurality of machine learning model-generated labels are predicted by the machine learning model instead of the one of the plurality of machine learning model-generated labels.

In accordance with one or more embodiments, responsive to identifying the one of the plurality of ML model-generated labels as problematic, the problematic label is removed and the machine learning model is retrained after the removal. For example, with reference to FIG. 2, action recommender 222 may provide a recommendation 238 based on notification 236 that recommends that the identified problematic label should be removed. The user may remove the problematic label and cause AI engine 210 to retrain AI model 214 without the problematic label via portal 212.

In accordance with one or more embodiments, the one of the plurality of machine learning model-generated labels is identified as disturbing other labels of the plurality of machine learning model-generated labels such that the one of the plurality of machine learning model-generated labels is incorrectly predicted by the machine learning model instead of the other labels.

In accordance with one or more embodiments, responsive to identifying the one of the plurality of ML model-generated labels as problematic, additional data items associated with the problematic label are provided to the machine learning model and the machine learning model is retrained accordingly. For example, with reference to FIG. 2, action recommender 222 may provide a recommendation 242 based on notification 240 that recommends that additional data items should be provided to AI model 214. The user may provide the additional data items to AI model 214 and cause AI engine 210 to retrain AI model 214 with the additional data items via portal 212.

III. Improving Model Performance

A. Identifying Suspect Categories and Training Data

Suspect categories and training samples (e.g., vectorized messages) may be identified and managed with automated detection. For example, categories may be evaluated and scored or ranked to identify suspect categories. Similarly, suspect (e.g., potentially inaccurate) training samples may be identified and automatically or manually managed.

Some samples may be inaccurately tagged, resulting in lower quality classification performance. Some categories may be too generic or broad, resulting in (e.g., widely) dispersed samples that may be between multiple categories. Referring again to FIG. 2, AI engine 210 may be configured to identify suspect samples and suspect categories that may be too general, such as "Other." Data items with inaccurate labels may lead to inaccurate labeling by an AI model. Data items having labels that are too generic may have an unpredictable nature and (e.g., therefore) may be difficult to predict. AI engine 210 may be configured to rank different labels and eliminate or suggest elimination (e.g., for training and/or inference) for labels having relatively low scores. In an example, scoring may be achieved using a "cluster score" technique. Scores may be calculated for each category and/or sample. A category and/or sample with a score below one or more thresholds may lead to a recommendation or decision to avoid sending the category and/or sample to training or to remove from training. A user may be permitted to decide whether or not to send a category or sample to training (e.g., ignoring or accepting a recommendation).

As previously described, data items may be vectorized (e.g., into numeric representations). Each feature in a data item may produce one or more slots in a vector. This representation allows AI engine 210 to measure a numerical distance between any two vectorized data items (e.g., samples or records) in a high dimension hyper plane.

Figure 6:
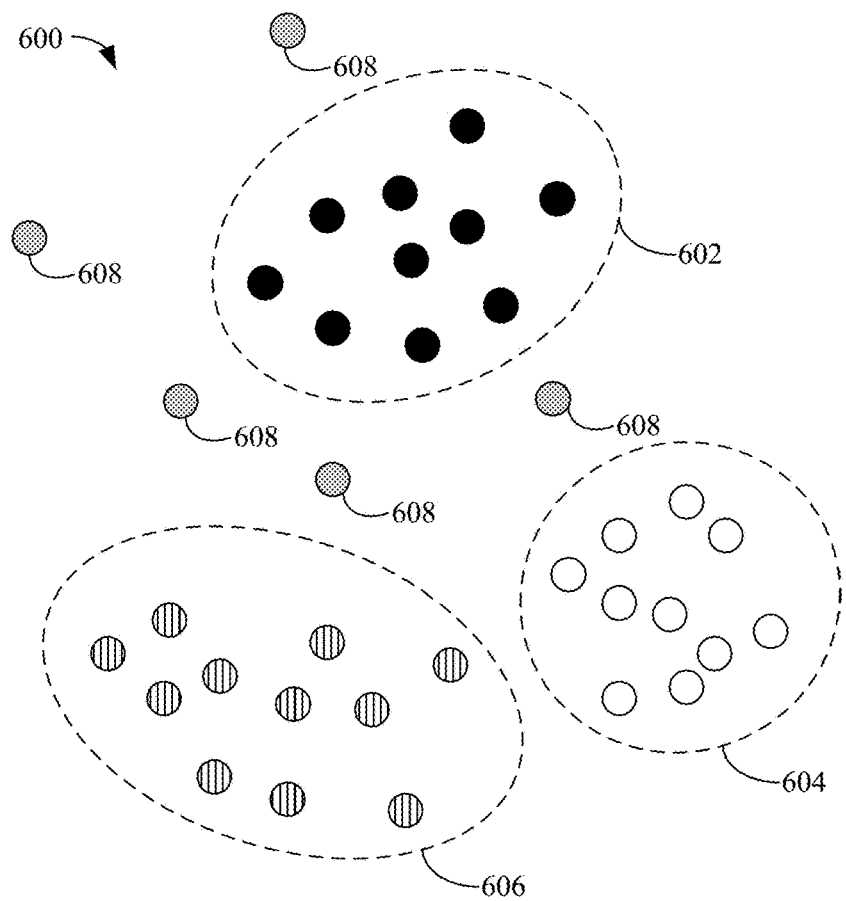
FIG. 6 shows a diagram illustrating a potentially suspect category or potentially samples around categorical clusters of samples in accordance with an example embodiment.

FIG. 6 shows a diagram illustrating a potentially suspect category or potentially suspect samples around categorical clusters of samples in accordance with an example embodiment. Example diagram 600 shows a simple, two-dimensional example of samples provided for training. Samples are shown in three probable clusters 602, 604, and 606. Other examples may have more dimensions. Cluster 602 represents a first category (e.g., label), cluster 604 represents a second label, and cluster 606 represents a third label. Samples 608 represent samples that may or may not be part of first, second or third clusters (categories) 602, 604 or 606. Samples 608 may comprise suspect samples. Samples 608 may cause problems with the training and inference performance of AI model 214 (e.g., with an impact similar to noisy data). For example, samples 608 may comprise inaccurately labeled samples or samples for a general (e.g., Other) category.

AI engine 210 may generate a category (e.g., label) score for each label, for example, using the total variance of samples. In an example, AI engine 210 may be configured to calculate (e.g., for each set of samples manually labeled with a particular category) a mean of all samples $\bar{x}$ and to calculate a total variance of samples $V_*$ comprising an average sum of distances for each sample $\vec{x_k}$ from the mean $\bar{x}$, for example, in accordance with Equation 4:

$$V_*[X] = \frac{1}{\#\,\text{samples}} \sum_{k=1}^{\#samples} \left\| \vec{x_k} - \bar{x} \right\|_* \quad \text{(Equation 4)}$$

where #samples represents the total number of training messages tagged or labeled with a given category and $\|\cdot\|_*$ represents a weighted norm. AI engine 210 may be configured to prioritize none or more elements in vectors $\vec{x_k}$, for example, based on variable importance (e.g., and prior knowledge). Weights may be implemented by the weighted norm $\|\cdot\|_*$ according to importance. In an example, the measure of distance from each sample $\vec{x_k}$ to the mean $\bar{x}$ may be a Euclidean distance.

In an example, AI engine 210 may generate a relatively low category (e.g., label) score for labels with training samples having a relatively high variance. Categories with relatively low scores may be recommended for refinement or elimination. AI model 214 may be retrained, for example, with a refined category. In accordance with an embodiment, AI engine 210 may provide a notification to action recommender 222 which causes a notification to be displayed to a user via portal 212. The notification may enable a user to require use of the category, refine the category (e.g., by relabeling samples in the category) or eliminate the category from training AI model 214. In the event the user decides the label is not to be discarded, a recommendation may be presented to the user to refine the label (e.g., split the label into one or more different categories, which may involve relabeling training samples).

Potentially inaccurately tagged messages may (e.g., also) be identified and managed, for example, based on a distance of a (e.g., each) vectorized message (e.g., sample $\vec{x}_k$) from a category mean $\bar{x}$. An identification procedure may be iterative, e.g., with multiple training and validation cycles that may use different samples as training and validation sets. Samples tagged with a category that are relatively (e.g., very) far away from the category mean may be outliers (e.g., inaccurately categorized, such as by human errors in categorization) or accurately categorized, but possibly misinterpreted by AI engine 210. Accurately and inaccurately categorized messages may be distinguished, for example, using a method based on a (e.g., specifically) trained generalization AI model (e.g., as opposed to an overfit model), such as evaluation model(s) 214. A list of predictions of samples sent for training may be created along with a probability of accurate prediction for each sample using the trained AI model. The distance of a (e.g., each) training sample from the category mean (in the category the sample is tagged with) may be calculated. A threshold may be defined for a distance from a category mean.

A sample that exceeds a threshold may be evaluated further (e.g., during cross validation), such as by K-fold validator 216 and training evaluator 246. During cross-validation, a trained AI model (e.g., classifier model(s) 214b) may infer a category for training samples that have been tagged with a category, but were not used to train an AI model. The inferred category may be compared to the tagged category (e.g., by K-fold validator 216), which may be validated (e.g., by manual or automated review) as accurate. In an example, a suspect sample (e.g., that exceeds a threshold distance from a category mean) may be identified as or declared (e.g., by training evaluator 246) inaccurately categorized as a suspected outlier (e.g., subject to removal as a training sample for the category) when, for example, (i) a predicted category is different from a tagged, assigned or true category (ii) with high confidence in the prediction. A suspect sample (e.g., that exceeds a threshold distance from a category mean) may be identified as or declared (e.g., by training evaluator 246) accurately categorized (e.g., meaning the sample is kept as a training sample for the category) when, for example, (i) a predicted category matches a tagged, assigned or true category. Accurate samples (e.g., vector values in samples) may be (e.g., manually or automatically) studied, evaluated or processed to improve AI model predictions. In an example, samples may be sorted, for example, by distance and/or by confidence level in the inaccuracy of a training label (e.g., for further evaluation or processing).

Figure 7:
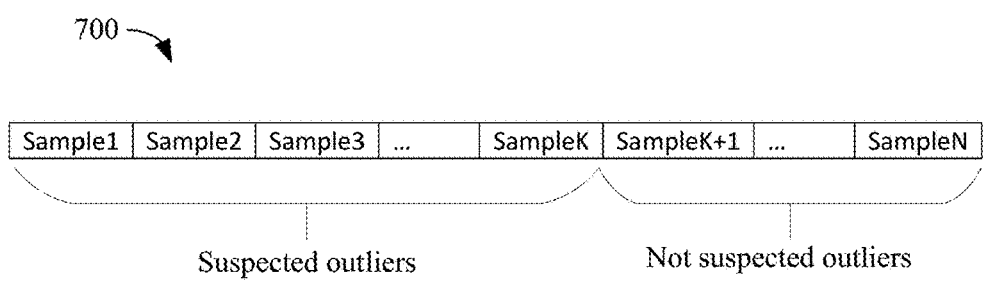
FIG. 7 shows an example list or array of sorted training samples in accordance with an example embodiment.

FIG. 7 shows an example list or array of sorted training samples. In example array 700, sample 1 through sample are suspected outliers while sample+1 through sampleN are not suspected outliers. The list may be constructed, for example, by training evaluator 246 based on the output of evaluation model(s) 214a and K-fold validator 216. Sample 1 through sampleN may be sorted into an array based on one or more sorting procedures (e.g., logic). For example, samples with a distance below a category threshold or samples deemed accurately categorized may be sorted by a confidence level associated with a category predicted for the samples. Samples with a distance exceeding a category threshold or samples that are deemed potentially inaccurately categorized (e.g., suspected outliers such as sample 1 through sampleN or samples 608) may be sorted by their distance from the category mean and/or a confidence level in a prediction that conflicts with a manual classification. Sorting may produce an array based on one or more sorting procedures. AI engine 210 may (e.g., based on none or more inputs by a user, such as a number or percentage of allowable suspected outliers) selectively remove samples (e.g., in order) in a sorted list or array.

In an example, a removal procedure may begin, for example, with suspected outliers furthest from category mean (e.g., sample 1) and may continue removing adjacent samples in the list until a desired objective is achieved, such as predictive accuracy for a category, a category mean score, a number or percentage of outliers permissible in a training set (e.g., which may be specified by a user via portal 212). A procedure may be iterative, for example (e.g., with one or more training and validation steps), to determine whether one or more objectives have been achieved by removing one or more training samples. Samples may be sorted (e.g., and removed), for example, based on a combination of distance from mean and confidence level in a classification that conflicts with an assigned training label. For example, sample 1 may comprise a sample with a greatest distance from category mean and a highest confidence level in an inaccurate training label.

B. User Control of Coverage and/or Accuracy of Auto-Label

A user may control coverage and/or accuracy of automated data item labeling by an AI model (e.g., classifier model(s) 214b). A user may manage taxonomies used to categorize the data, for example, between training processes (e.g., after a first model training). Portal 212 may provide a variety of configurations to choose from, such as a capability to choose a training model from multiple models to use for inference). Automated procedures may be provided (e.g., for selection), for example, to help improve AI models accuracy, such as category management and management of messages provided for training.

As previously indicated, a user may provide input with respect to training samples used to train an AI model. A user may indicate which categories a model should train for and which samples to use for training. A user may indicate which and/or how many suspect training samples to discard. A user may configure a sensitivity level for prediction (e.g., by a trained AI model). For example, a user may specify (e.g., directly or indirectly) whether a trained AI model should categorize or not categorize a message. In an example, a new message may be categorized, for example, only when a confidence level associated with a predicted category (predicted confidence) is above a user-defined threshold. In an example, a user may choose a percentage of messages to be categorized (e.g., a coverage). An AI engine algorithm (e.g., logic) may, for example, configure or set a confidence level threshold to satisfy specified coverage. This offers users customizable settings and experience.

In an example, user-specified or default coverage (e.g., for a particular trained model) may be too high, which may lead to a number of inaccurate predictions. A user may reduce coverage, for example, which may result in more accurate predictions for messages that are categorized by an AI model. Performance may be based on the quality of training samples. Over time, a model may improve performance, e.g., with continuous improvement, which may include retraining and validating with different training samples. A user may increase coverage, for example, based on AI model performance.

Figure 8:
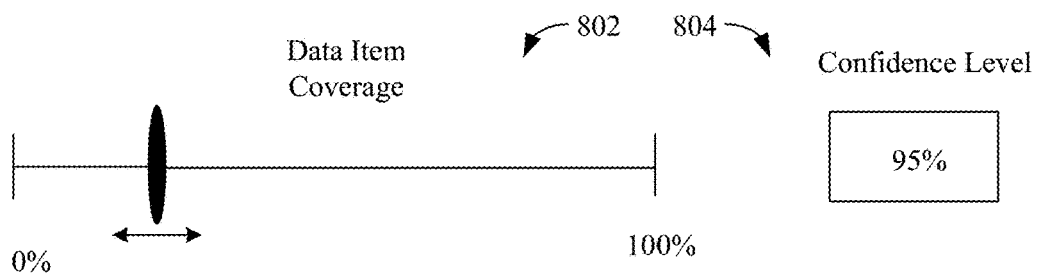
FIG. 8 shows exemplary user interface elements for enabling a user to specify coverage and/or accuracy of predictions required for categorization in accordance with an example embodiment.

FIG. 8 shows exemplary user interface elements for enabling a user to specify coverage and/or accuracy (e.g., confidence level) of predictions required for categorization in accordance with an example embodiment. Portal 212 may provide a user interface (e.g., for display by browser 118).

A tradeoff between the coverage of prediction and the confidence level of the prediction and further enable a user to control and set the coverage of prediction and/or the confidence level. User interface element 802 may be a dynamic scroller that enables the user to designate the coverage of data items for prediction, and user interface element 804 may be a text box in which the user may specify a confidence level for the predictions. A relationship is maintained between user interface element 802 and user interface element 804 such that if the value of the coverage of prediction is changed, so does the confidence level of prediction, and vice versa. For instance, as the dynamic scroller of user interface element 802 slides to the left, the confidence level shown in user interface element 804 is increased, and as the dynamic scroller of user interface element 802 slides to the right, the confidence level shown in user interface element 804 is decreased. It is noted that user interface elements 802 and 804 are purely exemplary and that other user interface elements may be utilized.

To enable the dynamic scroller of user interface element 802, an array of N tuples $\{(\hat{p}_j, \hat{s}_j)\}_{j=1}^{N}$ (where $\hat{p}_j$ corresponds to the confidence level and $s_j$ corresponds to the number of samples (or data items)) is formed so that changing the value of $s_j$ causes the display of confidence level $\hat{p}_j$.

During training of AI model 214, a number of samples or data items $\{m_i\}_{i=1}^{M}$ are obtained. After training AI model 214, AI model 214 predicts the labels of these M samples and keeps the confidence level (i.e., the estimated probability for a corrected prediction) of each sample and stores this array of probabilities in $\{p(m_i)\}_{i=1}^{M}$ from the training set (e.g., training set 226).

The confidence levels $\{p(m_i)\}_{i=1}^{M}$ are then sorted in a descending order and the K unique values are saved to a sequence $\{(\hat{p}_j, s_j)\}_{j=1}^{K}$.

If K≤N, then N is set equal to K and the list of tuples $$\left\{\left(\hat{p}_j, CDF_j = \frac{1}{M}\sum_{i=1}^{j} s_i\right)\right\}_{j=1}^{K}$$

is utilized. Otherwise, to use this sequence, a cumulative distribution function (CDF) is generated in accordance with Equation 5, which is shown below.

$$CDF_j = \frac{1}{M}\sum_{i=1}^{j} s_i \forall j = 1, \ldots, K \quad \text{(Equation 5)}$$

From Equation 5, it is shown that the CDF function is monotonically increasing and $CDF_K=1$. $CDF_0$ is set to 0 in order to get a scale from 0 to 1 (percentage). The CDF is fit using a smooth function and it is sampled uniformly into N slots. Since this function is monotonically increasing.

Implementations are not limited to the examples shown. Any number of computing devices and/or servers (including but not limited to machines and/or virtual machines) may be coupled in any manner via any type of computing environment. For example, one or more of computing device, server or storage components may be co-located, located remote from each other, combined or integrated on or distributed across one or more real or virtual machines.

Figure 9:
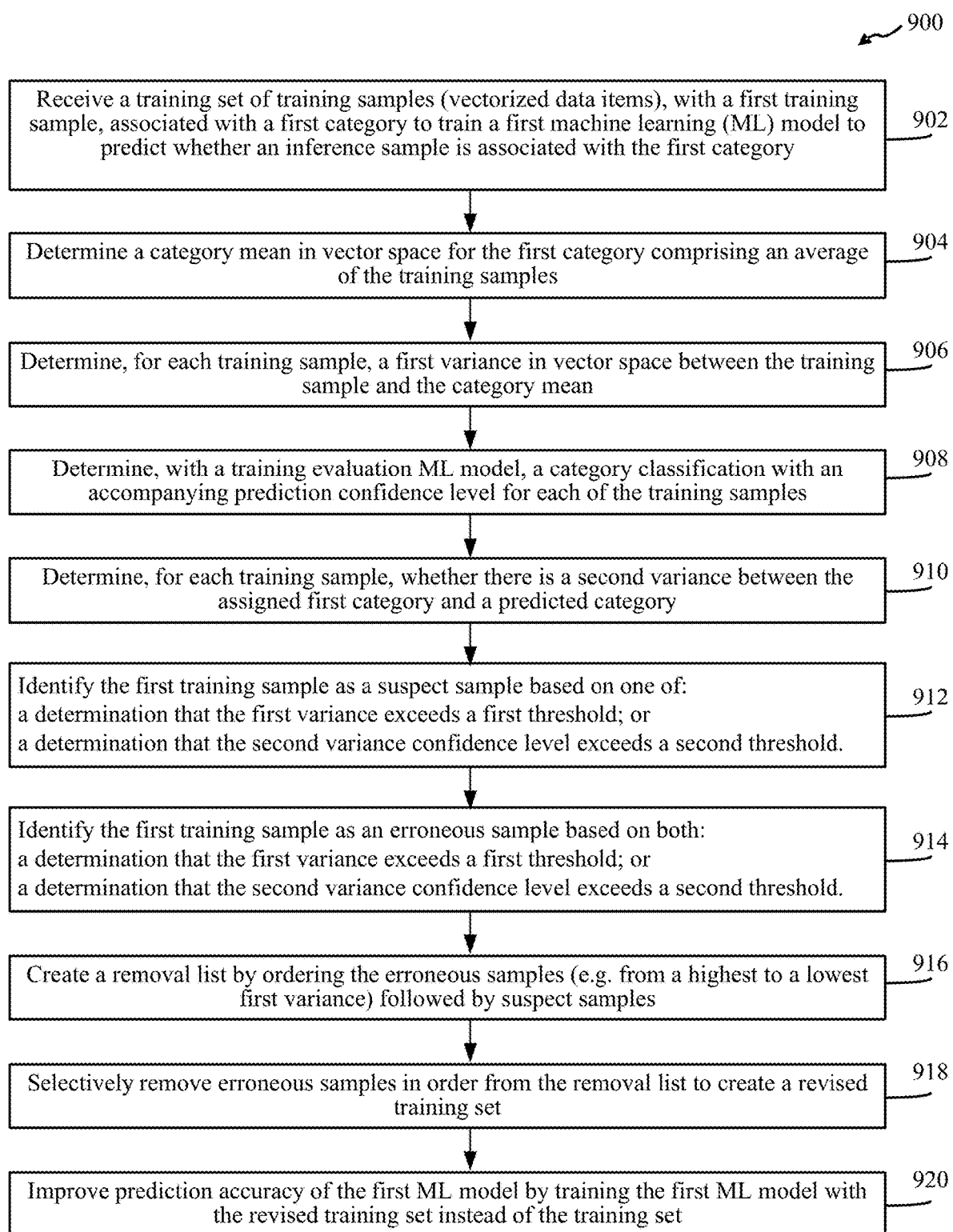
FIG. 9 shows a flowchart of a method for improving prediction accuracy of an ML (machine learning) model by identifying and eliminating erroneous training samples, according to an example embodiment.
Figure 10:
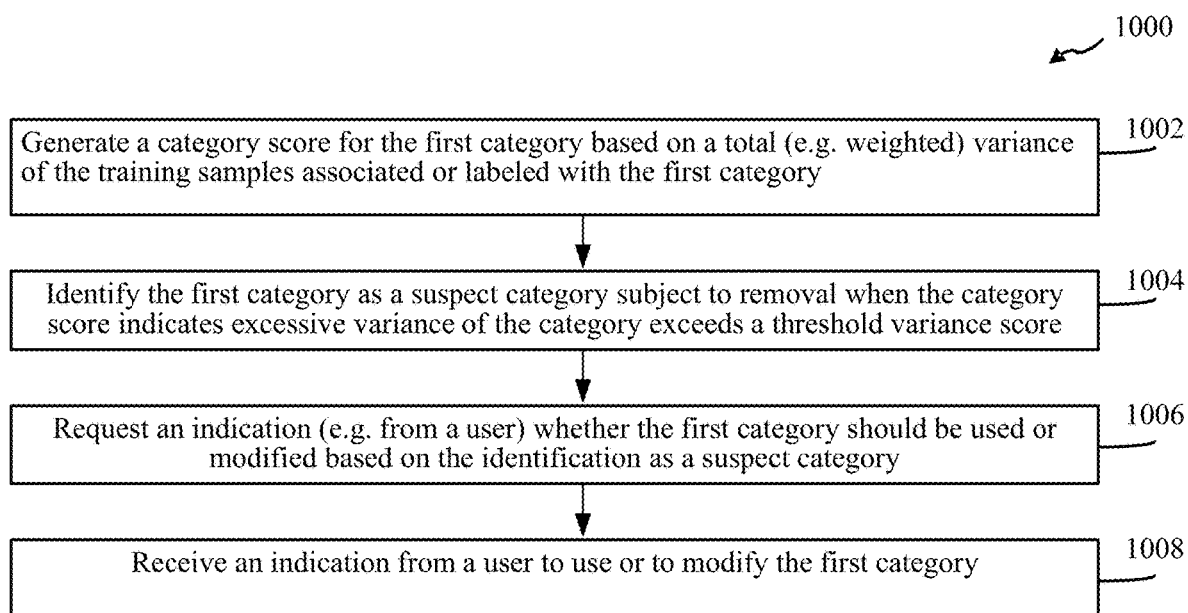
FIG. 10 shows a flowchart of a method for improving prediction accuracy of an ML model by identifying suspect categories, according to an example embodiment.
Figure 11:
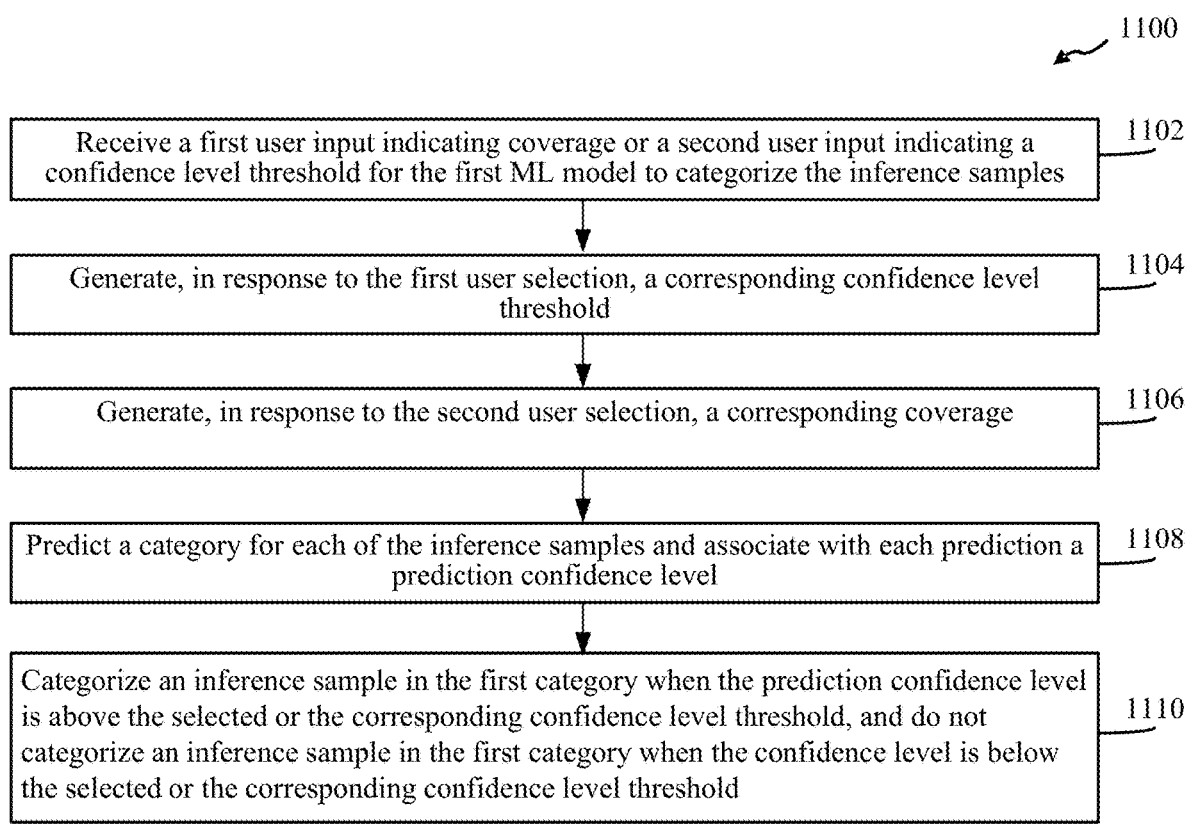
FIG. 11 shows a flowchart of a method for improving prediction accuracy of an ML model by generating prediction coverage or prediction accuracy in response to user input, according to an example embodiment.

Examples shown and discussed with respect to FIGS. 1-8 may operate, for example, according to example methods presented in FIGS. 9-11.

FIG. 9 shows a flowchart of a method 900 for improving prediction accuracy of an ML model by identifying and eliminating erroneous training samples, according to an example embodiment. Embodiments disclosed herein and other embodiments may operate in accordance with example method 900. Method 900 comprises steps 902-920. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 9. FIG. 9 is simply one of many possible embodiments. Embodiments may implement fewer, more or different steps.

In step 902, a training set may be received. The training set may comprise training samples (vectorized data items), with a first training sample. The training samples may be associated with a first category. The training set may be intended for use to train a first machine learning (ML) model to predict whether an inference sample is associated with the first category. For example, as shown in FIG. 2, data fetcher 208 may retrieve and provide training data 204 to AI engine 210. Training data 204 may be intended to train classifier model(s) 214b to predict categories for data items in inference data 206.

In step 904, a category mean may be determined for the first category. The category mean may comprise an average of the training samples in vector space. For example, as shown in FIG. 2, training evaluator 246 may determine a category mean for each category.

In step 906, a first variance may be determined for each training sample. The first variance may comprise a variance in vector space between the training sample and the category mean. For example, as shown in FIG. 2, training evaluator 246 may determine a variance between each training sample and a respective category mean.

In step 908, a category classification with an accompanying prediction confidence level may be determined (e.g., by a training evaluation ML model) for each of the training samples. For example, as shown in FIG. 2, evaluation model(s) 214a may determine a classification for each training sample, where each classification may be accompanied by a prediction confidence level.

In step 910, a determination may be made, for each training sample, whether there is a second variance between the assigned first category and a predicted category. For example, as shown in FIG. 2, K-fold validator 216 may compare an assigned training category to a predicted category to determine whether there is a potential category labeling error (e.g., a suspect training sample). K-fold validator 216 may provide results to training evaluator 246.

In step 912, a training sample (e.g., the first training sample) may be identified as a suspect sample based on one of: a determination that the first variance exceeds a first threshold; or a determination that the second variance confidence level exceeds a second threshold. For example, as shown in FIG. 2, training evaluator 246 may identify one or more training samples as suspect training samples if (i) the vector space variance of a training sample exceeds a first threshold or (ii) a predicted category varies from an assigned category for a training sample (e.g., and if a confidence level exceeds a second threshold).

In step 914, a training sample (e.g., the first training sample) may be identified as an erroneous sample based on both: a determination that the first variance exceeds a first threshold; or a determination that the second variance confidence level exceeds a second threshold. For example, as shown in FIG. 2, training evaluator 246 may identify one or more training samples as erroneous training samples if (i) the vector space variance of a training sample exceeds a first threshold and (ii) a predicted category varies from an assigned category for a training sample (e.g., and if a confidence level exceeds a second threshold).

In step 916, a removal list may be created by ordering the erroneous samples (e.g., from a highest to a lowest first variance) followed by suspect samples. For example, as shown in FIG. 2, training evaluator 246 may create a removal list that prioritizes removal of erroneous training samples before suspect training samples.

In step 918, erroneous samples may be selectively removed in order from the removal list to create a revised training set. For example, as shown in FIG. 2, training evaluator 246 may cause data fetcher 208 to selectively remove training samples (e.g., based on user input provided through portal 212). For example, data fetcher 208 may change an assigned category for targeted training samples so that they are not fetched as training data 204 when classifier model(s) 214*b* is trained for the category in question.

In step 920, prediction accuracy of the first ML model may be improved by training the first ML model with the revised training set instead of the training set. For example, as shown in FIG. 2, classifier model(s) 214*b* may be trained by training data 204 that has been revised by removing erroneous and/or suspect training samples.

FIG. 10 shows a flowchart of a method 1000 for improving prediction accuracy of an ML model by identifying suspect categories, according to an example embodiment, according to an example embodiment. Embodiments disclosed herein and other embodiments may operate in accordance with example method 1000. Method 1000 comprises steps 1002-1008. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 10. FIG. 10 is simply one of many possible embodiments. Embodiments may implement fewer, more or different steps.

In step 1002, a category score may be generated for the first category based on a total (e.g., weighted) variance of the training samples associated or labeled with the first category. For example, as shown in FIG. 2, training evaluator 246 may generate a category score (e.g., for each category of training samples) based on a total (e.g., weighted) variance of the training samples associated with a category.

In step 1004, the first category may be identified as a suspect category subject to removal when the category score indicates excessive variance of the category exceeds a threshold variance score. For example, as shown in FIG. 2, training evaluator 246 may identify a category as a suspect category when a category score indicates excessive variance of the category that exceeds a threshold variance score.

In step 1006, an indication may be requested (e.g., from a user) whether the first category should be used or modified based on the identification as a suspect category. For example, as shown in FIG. 2, training evaluator 246 may cause portal 212 to display to a user and request user input to indicate whether the suspect category should be used as is, modified or removed.

In step 1008, an indication may be received from a user to use or to modify the first category. For example, as shown in FIG. 2, a user may provide an input through portal 212 to indicate whether the suspect category should be used as is, modified or removed.

FIG. 11 shows a flowchart of a method 1100 for improving prediction accuracy of an ML model by generating prediction coverage or prediction accuracy in response to user input, according to an example embodiment, according to an example embodiment. Embodiments disclosed herein and other embodiments may operate in accordance with example method 1100. Method 1100 comprises steps 1102-1110. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 11. FIG. 11 is simply one of many possible embodiments. Embodiments may implement fewer, more or different steps.

In step 1102, a first user input or a second user input may be received. The first user input may indicate prediction coverage for the first ML model to categorize the inference samples. The second user input may indicate a confidence level threshold for the first ML model to categorize the inference samples. For example, as shown in FIG. 2, a user may provide input through portal 212 indicating, as shown by example in FIG. 8, coverage or confidence level for category predictions by classifier model(s) 214*b* for data items in inference data 206.

In step 1104, a corresponding confidence level threshold may be generated in response to the first user input. For example, as shown in FIG. 2, portal 212 may generate prediction accuracy corresponding to a prediction coverage selected by a user.

In step 1106, a corresponding coverage may be generated in response to the second user input. For example, as shown in FIG. 2, portal 212 may generate prediction coverage corresponding to prediction accuracy selected by a user.

In step 1108, a category may be predicted for each of the inference samples. A prediction confidence level may be associated with each prediction. For example, as shown in FIG. 2, classifier model(s) 214*b* may predict a category for each data item in inference data 206. Classifier model(s) 214*b* may generate a prediction accuracy level for each prediction.

In step 1110, an inference sample may be (i) categorized in the first category when the prediction confidence level is above the selected or the corresponding confidence level threshold, and (ii) not categorized in the first category when the confidence level is below the selected or the corresponding confidence level threshold. For example, as shown in FIG. 2, classifier model(s) 214b and/or data fetcher 208 may determine, for each data item in inference data 206 that classifier model(s) 214b made a prediction, whether to associate the predicted category with the data item based on whether the prediction confidence level associated with the prediction exceeds the prediction accuracy specified by a user or the corresponding confidence level generated by portal 212 in response to user specified prediction coverage.

IV. Example Computer System Implementation

Data item labeler 102, data fetcher 108, AI engine 110, AI model 114, portal 112, browser 118, data item labeler 200, data fetcher 208, AI engine 210, K-fold validator 216, AI model 214, evaluation model(s) 214a, classifier model(s) 214b, training evaluator 246, matrix generator 218, confusion matrix 228, matrix analyzer 220, action recommender 222, portal 212, confusion matrix 300, confusion matrix 400 (and/or any of the components described therein), and/or flowcharts 500, 900, 1000, 1100, may be implemented in hardware, or hardware combined with one or both of software and/or firmware. For example, data item labeler 102, data fetcher 108, AI engine 110, AI model 114, portal 112, browser 118, data item labeler 200, data fetcher 208, AI engine 210, K-fold validator 216, AI model 214, evaluation model(s) 214a, classifier model(s) 214b, training evaluator 246, matrix generator 218, confusion matrix 228, matrix analyzer 220, action recommender 222, portal 212, confusion matrix 300, confusion matrix 400 (and/or any of the components described therein), and/or flowcharts 500, 900, 1000, 1100 may be implemented as computer program code/instructions configured to be executed in one or more processors and stored in a computer readable storage medium.

Alternatively, data item labeler 102, data fetcher 108, AI engine 110, AI model 114, portal 112, browser 118, data item labeler 200, data fetcher 208, AI engine 210, K-fold validator 216, AI model 214, evaluation model(s) 214a, classifier model(s) 214b, training evaluator 246, matrix generator 218, confusion matrix 228, matrix analyzer 220, action recommender 222, portal 212, confusion matrix 300, confusion matrix 400 (and/or any of the components described therein), and/or flowcharts 500, 900, 1000, 1100 may be implemented as hardware logic/electrical circuitry.

For instance, in an embodiment, one or more, in any combination, of data item labeler 102, data fetcher 108, AI engine 110, AI model 114, portal 112, browser 118, data item labeler 200, data fetcher 208, AI engine 210, K-fold validator 216, AI model 214, evaluation model(s) 214a, classifier model(s) 214b, training evaluator 246, matrix generator 218, confusion matrix 228, matrix analyzer 220, action recommender 222, portal 212, confusion matrix 300, confusion matrix 400 (and/or any of the components described therein), and/or flowcharts 500, 900, 1000, 1100 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 12:
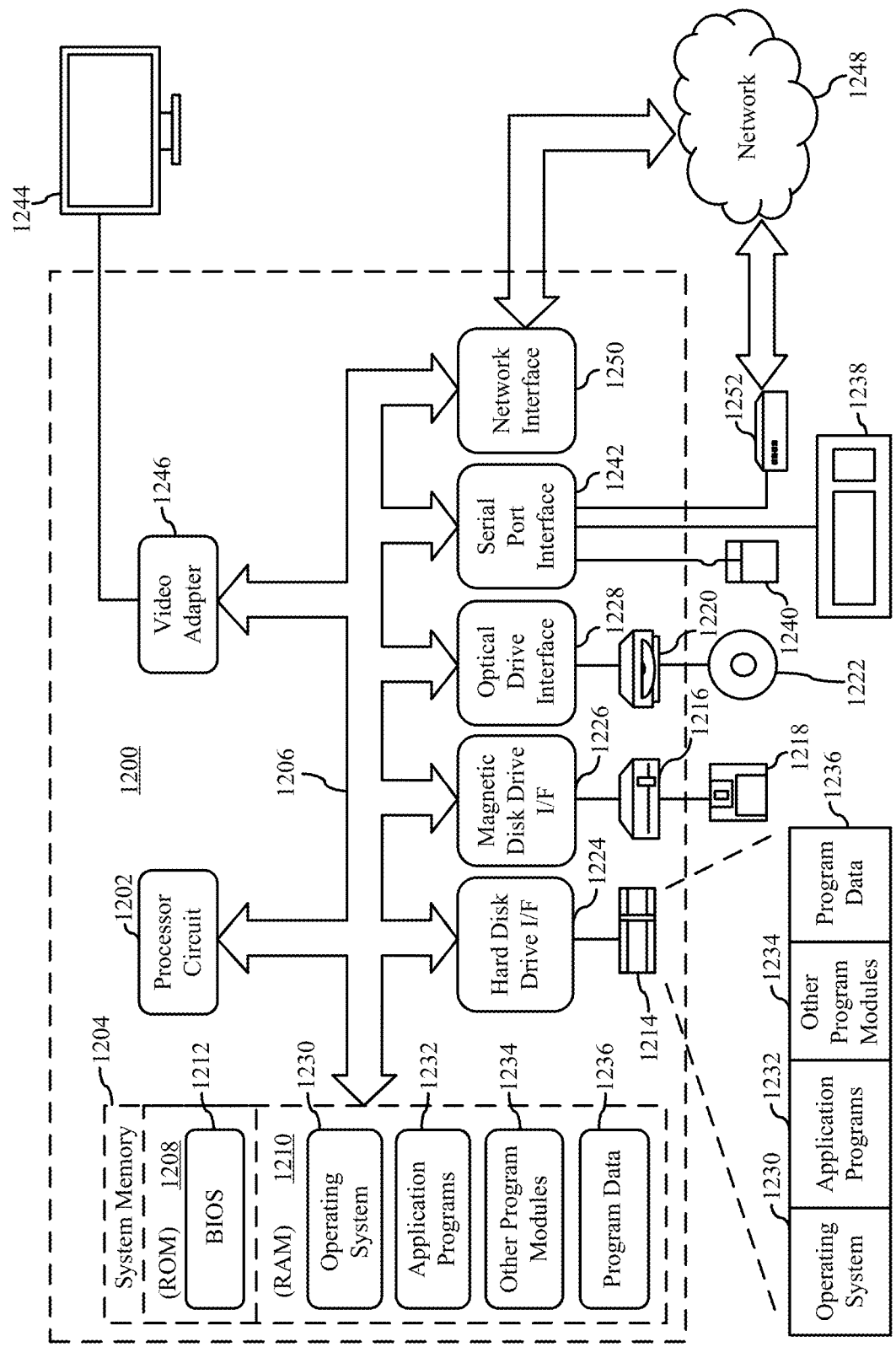
FIG. 12 is a block diagram of an example processor-based computer system that may be used to implement various embodiments.

FIG. 12 depicts an exemplary implementation of a computing device 800 in which embodiments may be implemented. For example, data item labeler 102, data fetcher 108, AI engine 110, AI model 114, portal 112, computing device 116, browser 118, data item labeler 200, data fetcher 208, AI engine 210, K-fold validator 216, AI model 214, matrix generator 218, confusion matrix 228, matrix analyzer 220, action recommender 222, portal 212, confusion matrix 300, and confusion matrix 400 (and/or any of the components described therein) flowchart 500, flowchart 900, flowchart 1000, and/or flowchart 1100 (including any step(s) included therein) may be implemented in one or more computing devices similar to computing device 1200 in stationary or mobile computer embodiments, including one or more features of computing device 1200 and/or alternative features. The description of computing device 1200 provided herein is provided for purposes of illustration and is not intended to be limiting. Embodiments may be implemented in further types of computer systems, as would be known to persons skilled in the relevant art(s).

As shown in FIG. 12, computing device 1200 includes one or more processors, referred to as processor circuit 1202, a system memory 1204, and a bus 1206 that couples various system components including system memory 1204 to processor circuit 1202. Processor circuit 1202 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1202 may execute program code stored in a computer readable medium, such as program code of operating system 1230, application programs 1232, other programs 1234, etc. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random-access memory (RAM) 1210. A basic input/output system 1212 (BIOS) is stored in ROM 1208.

Computing device 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 1230, one or more application programs 1232, other programs 1234, and program data 1236. Application programs 1232 or other programs 1234 may include, for example, computer program logic (e.g., computer program code or instructions) for implementing any of the features of data item labeler 102, data fetcher 108, AI engine 110, AI model 114, portal 112, browser 118, data item labeler 200, data fetcher 208, AI engine 210, K-fold validator 216, AI model 214, evaluation model(s) 214a, classifier model(s) 214b, training evaluator 246, matrix generator 218, confusion matrix 228, matrix analyzer 220, action recommender 222, portal 212, confusion matrix 300, confusion matrix 400 (and/or any of the components described therein), and/or flowcharts 500, 900, 1000, 1100, and/or further embodiments described herein.

A user may enter commands and information into computing device 1200 through input devices such as keyboard 1238 and pointing device 1240. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1202 through a serial port interface 1242 that is coupled to bus 1206, but may be connected by other interfaces, such as a parallel port, game port, or a universal serial bus (USB).

A display screen 1244 is also connected to bus 1206 via an interface, such as a video adapter 1246. Display screen 1244 may be external to, or incorporated in computing device 1200. Display screen 1244 may display information, as well as being a user interface for receiving user commands and/or other information (e.g., by touch, finger gestures, virtual keyboard, etc.). In addition to display screen 1244, computing device 1200 may include other peripheral output devices (not shown) such as speakers and printers.

Computing device 1200 is connected to a network 1248 (e.g., the Internet) through an adaptor or network interface 1250, a modem 1252, or other means for establishing communications over the network. Modem 1252, which may be internal or external, may be connected to bus 1206 via serial port interface 1242, as shown in FIG. 12, or may be connected to bus 1206 using another interface type, including a parallel interface.

As used herein, the terms "computer program medium," "computer-readable medium," and "computer-readable storage medium" are used to refer to physical hardware media such as the hard disk associated with hard disk drive 1214, removable magnetic disk 1218, removable optical disk 1222, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1232 and other programs 1234) may be stored on the hard disk, magnetic disk, optical disk, ROM, RAM, or other hardware storage medium. Such computer programs may also be received via network interface 1250, serial port interface 1242, or any other interface type. Such computer programs, when executed or loaded by an application, enable computing device 1200 to implement features of embodiments discussed herein. Accordingly, such computer programs represent controllers of the computing device 1200.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Additional Example Embodiments

Methods, systems and computer program products are provided to improve machine learning (ML) model-based classification of data items by identifying and removing inaccurate training data. Inaccurate training samples may be identified, for example, based on excessive variance in vector space between a training sample and a mean of category training samples, and based on a variance between an assigned category and a predicted category for a training sample. Suspect or erroneous samples may be selectively removed based on, for example, vector space variance and/or prediction confidence level. As a result, ML model accuracy may be improved by training on a more accurate revised training set. ML model accuracy may (e.g., also) be improved, for example, by identifying and removing suspect categories with excessive (e.g., weighted) vector space variance. Suspect categories may be retained or revised. Users may (e.g., also) specify a prediction confidence level and/or coverage (e.g., to control accuracy).

In an example, a method may comprise, for example, receiving a training set with training samples, including a first training sample, associated or labeled with a first category to train a first machine learning (ML) model to predict whether an inference sample is associated with the first category, where a sample comprises a vectorized data item; and improving prediction accuracy of the first ML model by identifying the first training sample as an erroneous sample based on: a first variance in vector space between the first training sample and a category mean comprising an average of the training samples; and a second variance between the first category and a predicted category for the first training sample.

In an example, the second variance may comprise, for example, the predicted category as a second category, different from the first category, and a confidence level in an accuracy of the predicted category.

In an example, the identification of the first training sample as an erroneous sample may comprise, for example, determining that the first variance exceeds a first threshold; and determining that the confidence level exceeds a second threshold.

In an example, the method may further comprise, for example, identifying the first training sample as a suspect sample based on one of: determining that the first variance exceeds the first threshold; or determining that the confidence level exceeds the second threshold.

In an example, the method may further comprise, for example, creating a removal list by ordering the erroneous samples from a highest to a lowest first variance; and selectively removing the erroneous samples in order from the removal list to create a revised training set.

In an example, the method may further comprise, for example, receiving a user input indicating whether or how many erroneous samples to remove.

In an example, the method may further comprise, for example, training the first ML model with the revised training set instead of the training set.

In an example, the method may further comprise, for example, creating a removal list by ordering the suspect sample for removal after erroneous samples.

In an example, the predicted category may be predicted by a second ML model (e.g., in addition to the first model).

In an example, the method may further comprise, for example, receiving a first user selection indicating coverage or a second user selection indicating a confidence level threshold for the first ML model to categorize the inference samples; selecting, in response to the first user selection, a corresponding confidence level threshold; selecting, in response to the second user selection, a corresponding coverage; predicting a category for each of the inference samples and associating with each predicted category a prediction confidence level; categorizing an inference sample as being in the first category when the prediction confidence level is above the selected or the corresponding confidence level threshold; and not categorizing an inference sample as being in the first category when the confidence level is below the selected or the corresponding confidence level threshold.

In an example, the method may further comprise, for example, generating a category score for the first category based on a total variance of the training samples associated or labeled with the first category; identifying the first category as a suspect category subject to removal when the category score indicates excessive variance of the training samples relative to a threshold variance score.

In an example, the total variance may be calculated, for example, based on weighted elements of data items vectorized in the training samples.

In an example, the method may further comprise, for example, notifying a user about the suspect category; and requesting the user to indicate whether to use or to modify the suspect category.

In an example, an apparatus or a system may comprise, for example, a processor circuit; and a memory that stores program code configured to be executed by the at least one processor circuit, the program code comprising: a data fetcher configured to receive a training set comprising training samples, including a first training sample, associated or labeled with a first category to train a first machine learning (ML) model to predict whether an inference sample is associated with the first category, where a sample comprises a vectorized data item; and an artificial intelligence (AI) engine configured to: identify the first training sample as an erroneous sample based on: a first variance in vector space between the first training sample and a category mean comprising an average of the training samples; and a second variance between the first category and a predicted category for the first training sample.

In an example, the AI engine may be further configured to selectively remove the erroneous samples from the training set to create a revised training set; and train the first ML model with the revised training set instead of the training set.

In an example, the AI engine may be further configured to receive a first user selection indicating coverage or a second user selection indicating a confidence level threshold for the first ML model to categorize the inference samples; select, in response to the first user selection, a corresponding confidence level threshold; select, in response to the second user selection, a corresponding coverage; predict a category for each of the inference samples and associating with each predicted category a prediction confidence level; and categorize an inference sample as being in the first category when the prediction confidence level is above the selected or the corresponding confidence level threshold and not categorizing the inference sample as being in the first category when the confidence level is below the selected or the corresponding confidence level threshold.

In an example, the AI engine may be further configured to generate a category score for the first category based on a total variance of the training samples associated or labeled with the first category; identify the first category as a suspect category subject to removal when the category score indicates excessive variance of the training samples relative to a threshold variance score; and request user input to indicate whether to use or to modify the suspect category.

In an example, a computer-readable storage medium may comprise, for example, program instructions recorded thereon that, when executed by at least one processor of a computing device, perform a method, the method comprising: receiving a training set comprising training samples, including a first training sample, associated or labeled with a first category to train a first machine learning (ML) model to predict whether an inference sample is associated with the first category, where a sample comprises a vectorized data item; and improving prediction accuracy of the first ML model by identifying the first training sample as an erroneous sample based on: a first variance in vector space between the first training sample and a category mean comprising an average of the training samples; and a second variance between the first category and a predicted category for the first training sample, wherein the second variance comprises the predicted category as a second category, different from the first category, and a confidence level in an accuracy of the predicted category; selectively removing at least one of the erroneous samples from the training set to create a revised training set; and training the first ML model with the revised training set instead of the training set.

In an example, the method may further comprise, for example, receiving at least one of a first user selection indicating coverage or a second user selection indicating a confidence level threshold for the first ML model to categorize the inference samples; selecting, in response to the first user selection, a corresponding confidence level threshold; selecting, in response to the second user selection, a corresponding coverage; predicting a category for each of the inference samples and associating with each predicted category a prediction confidence level; and categorizing an inference sample as being in the first category when the prediction confidence level is above the selected or the corresponding confidence level threshold and not categorizing an inference sample as being in the first category when the confidence level is below the selected or the corresponding confidence level threshold.

In an example, the method may further comprise, for example, generating a category score for the first category based on a total variance of the training samples associated or labeled with the first category; and identifying the first category as a suspect category subject to removal when the category score indicates excessive variance of the training samples relative to a threshold variance.

Additional examples of methods are described herein. In an example, a method comprises: receiving from a data store a plurality of data items and a user-generated label associated with each data item in the plurality of data items; validating a machine learning (ML) model by: training the ML model using a first portion of the plurality of data items and the user-generated labels associated therewith; providing as input to the ML model a second portion of the plurality of data items; receiving from the ML model one of a plurality of ML model-generated labels for each data item in the second portion of the plurality of data items; and comparing the user-generated label associated with each data item in the second portion of the plurality of data items with the ML model-generated label associated with the same data item in the second portion of the plurality of data items; based on the validating of the ML model, determining a confusion metric for each distinct pair of labels in the plurality of ML model-generated labels; and based on the confusion metrics, identifying one of the plurality of ML model-generated labels as a problematic label.

In an example, the plurality of data items comprises at least one of: e-mails; customer relationship management application-related messages; or support ticketing system-related messages.

In an example, identifying the one of the plurality of ML model-generated labels as problematic comprises: identifying the one of the plurality of ML model-generated labels as being in conflict with another label of the plurality of ML model-generated labels.

In an example, the method further comprises: performing, responsive to the identifying the one of the plurality of ML model-generated labels as problematic: merging the problematic label with the other label that is conflict with the problematic label; and retraining the ML model after said merging.

In an example, the identifying the one of the plurality of ML model-generated labels as problematic comprises: identifying the one of the plurality of ML model-generated labels as a relatively weak label such that other labels of the plurality of ML model-generated labels are predicted by the ML model instead of the one of the plurality of ML model-generated labels.

In an example, the method further comprises: performing, responsive to the identifying the one of the plurality of ML model-generated labels as problematic: removing the problematic label; and retraining the ML model after said removing.

In an example, identifying the one of the plurality of ML model-generated labels as problematic comprises: identifying the one of the plurality of ML model-generated labels as disturbing other labels of the plurality of ML model-generated labels such that the one of the plurality of ML model-generated labels is incorrectly predicted by the ML model instead of the other labels.

In an example, the method further comprises: performing, responsive to the identifying the one of the plurality of ML model-generated labels as problematic: providing additional data items associated with the problematic label to the ML model; and retraining the ML model based on said providing.

In an example, the validating is performed a k number of iterations, wherein k is any positive integer, and wherein the confusion metric for each distinct pair of labels in the plurality of ML model-generated labels is aggregated across the k iterations.

Additional examples of systems are described herein. The system includes at least one processor circuit; and at least one memory that stores program code configured to be executed by the at least one processor circuit, the program code comprising: a data fetcher configured to receive from a data store a plurality of data items and a user-generated label associated with each data item in the plurality of data items; and an artificial intelligence engine configured to: validate a machine learning (ML) model by: training the ML model using a first portion of the plurality of data items and the user-generated labels associated therewith; providing as input to the ML model a second portion of the plurality of data items; receiving from the ML model one of a plurality of ML model-generated labels for each data item in the second portion of the plurality of data items; and comparing the user-generated label associated with each data item in the second portion of the plurality of data items with the ML model-generated label associated with the same data item in the second portion of the plurality of data items; based on the validating of the ML model, determine a confusion metric for each distinct pair of labels in the plurality of ML model-generated labels; and based on the confusion metrics, identify one of the plurality of ML model-generated labels as a problematic label.

In an example, the plurality of data items comprises at least one of: e-mails; customer relationship management application-related messages; or support ticketing system-related messages.

In an example, the artificial intelligence engine is configured to identify the one of the plurality of ML model-generated labels as problematic by: identifying the one of the plurality of ML model-generated labels as being in conflict with another label of the plurality of ML model-generated labels.

In an example, the artificial intelligence engine is further configured to perform, responsive to identifying the one of the plurality of ML model-generated labels as problematic, merging the problematic label with the other label that is conflict with the problematic label; and retraining the ML model after said merging.

In an example, the artificial intelligence engine is configured to identify the one of the plurality of ML model-generated labels as problematic by: identifying the one of the plurality of ML model-generated labels as a relatively weak label such that other labels of the plurality of ML model-generated labels are predicted by the ML model instead of the one of the plurality of ML model-generated labels.

In an example, the artificial intelligence engine is further configured to perform, responsive to identifying the one of the plurality of ML model-generated labels as problematic, removing the problematic label; and retraining the ML model after said removing.

In an example, the artificial intelligence engine is configured to identify the one of the plurality of ML model-generated labels as problematic by: identifying the one of the plurality of ML model-generated labels as disturbing other labels of the plurality of ML model-generated labels such that the one of the plurality of ML model-generated labels is incorrectly predicted by the ML model instead of the other labels.

In an example, the artificial intelligence engine is further configured to perform, responsive to identifying the one of the plurality of ML model-generated labels as problematic, providing additional data items associated with the problematic label to the ML model; and retraining the ML model based on said providing.

Additional examples are disclosed for computer-readable storage mediums having program instructions recorded thereon that, when executed by a processor of a computing device, perform a method. In an example, a method comprises: receiving from a data store a plurality of data items and a user-generated label associated with each data item in the plurality of data items; validating a machine learning (ML) model by: training the ML model using a first portion of the plurality of data items and the user-generated labels associated therewith; providing as input to the ML model a second portion of the plurality of data items; receiving from the ML model one of a plurality of ML model-generated labels for each data item in the second portion of the plurality of data items; and comparing the user-generated label associated with each data item in the second portion of the plurality of data items with the ML model-generated label associated with the same data item in the second portion of the plurality of data items; based on the validating of the ML model, determining a confusion metric for each distinct pair of labels in the plurality of ML model-generated labels; and based on the confusion metrics, identifying one of the plurality of ML model-generated labels as a problematic label.

In an example, the plurality of data items comprises at least one of: e-mails; customer relationship management application-related messages; or support ticketing system-related messages.

In an example, identifying the one of the plurality of ML model-generated labels as problematic comprises: identifying the one of the plurality of ML model-generated labels as being in conflict with another label of the plurality of ML model-generated labels.

VI. Example Embodiments

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method, comprising:
providing, as input to a machine learning (ML) model trained on a first portion of a plurality of data items and user-generated labels associated with the data items, a second portion of the data items;
receiving from the ML model ML model-generated labels for the data items in the second portion;
comparing the user-generated labels and the ML model-generated labels associated with same data items in the second portion;
determining a confusion metric for each distinct pair of labels in the ML model-generated labels based on said comparing to determine a plurality of confusion metrics; and
identifying an ML model-generated label of the ML model-generated labels as a problematic label based on the determined confusion metrics, the problematic label being in conflict with another ML-generated label of the ML model-generated labels.

2. The method of claim 1, further comprising:
receiving from a data store the plurality of data items and the user-generated labels associated with the data items; and
training the ML model using the first portion of the data items and the associated user-generated labels.

3. The method of claim 1, further comprising:
merging the identified problematic label with the ML-generated label the identified problematic label is identified as being in conflict with.

4. The method of claim 1, further comprising:
retraining the ML model on labels that do not include the identified problematic label.

5. The method of claim 1, further comprising:
retraining the ML model on additional data items associated with the identified problematic label.

6. The method of claim 1, wherein the plurality of data items comprises at least one of e-mails, customer relationship management application-related messages, or support ticketing system-related messages.

7. A system, comprising:
a processor; and
a memory device that stores program code structured to cause the processor to:
provide, as input to a machine learning (ML) model trained on a first portion of a plurality of data items and user-generated labels associated with the data items, a second portion of the data items;
receive from the ML model ML model-generated labels for the data items in the second portion;
compare the user-generated labels and the ML model-generated labels associated with same data items in the second portion;
determine a confusion metric for each distinct pair of labels in the ML model-generated labels based on the compare to determine a plurality of confusion metrics; and
identify an ML model-generated label of the ML model-generated labels as a problematic label based on the determined confusion metrics, the problematic label being in conflict with another ML-generated label of the ML model-generated labels.

8. The system of claim 7, wherein the program code is further structured to cause the processor to:
receive from a data store the plurality of data items and the user-generated labels associated with the data items; and
train the ML model using the first portion of the data items and the associated user-generated labels.

9. The system of claim 7, wherein the program code is further structured to cause the processor to:
merge the identified problematic label with the ML-generated label the identified problematic label is identified as being in conflict with.

10. The system of claim 7, wherein the program code is further structured to cause the processor to:
retrain the ML model on labels that do not include the identified problematic label.

11. The system of claim 7, wherein the program code is further structured to cause the processor to:
retrain the ML model on additional data items associated with the identified problematic label.

12. The system of claim 7, wherein the plurality of data items comprises at least one of e-mails, customer relationship management application-related messages, or support ticketing system-related messages.

13. A computer-readable storage device having instructions recorded thereon that, when executed by a processor, implements a method comprising:
providing, as input to a machine learning (ML) model trained on a first portion of a plurality of data items and user-generated labels associated with the data items, a second portion of the data items;
receiving from the ML model ML model-generated labels for the data items in the second portion;

comparing the user-generated labels and the ML model-generated labels associated with same data items in the second portion;

determining a confusion metric for each distinct pair of labels in the ML model-generated labels based on said comparing to determine a plurality of confusion metrics; and identifying an ML model-generated label of the ML model-generated labels as a problematic label based on the determined confusion metrics, the problematic label being in conflict with another ML-generated label of the ML model-generated labels.

14. The computer-readable storage device of claim 13, the method further comprising:

receiving from a data store the plurality of data items and the user-generated labels associated with the data items; and training the ML model using the first portion of the data items and the associated user-generated labels.

15. The computer-readable storage device of claim 13, the method further comprising:

merging the identified problematic label with the ML-generated label the identified problematic label is identified as being in conflict with.

16. The computer-readable storage device of claim 13, the method further comprising:

retraining the ML model on labels that do not include the identified problematic label.

17. The computer-readable storage device of claim 13, the method further comprising:

retraining the ML model on additional data items associated with the identified problematic label.

18. The method of claim 1, further comprising:

providing a recommendation that the identified problematic label be merged with the ML-generated label the identified problematic label is identified as being in conflict with.

19. The system of claim 7, wherein the program code is further structured to cause the processor to:

provide a recommendation that the identified problematic label be merged with the ML-generated label the identified problematic label is identified as being in conflict with.

20. The computer-readable storage device of claim 13, the method further comprising:

providing a recommendation that the identified problematic label be merged with the ML-generated label the identified problematic label is identified as being in conflict with.

* * * * *